United States Patent
Sano et al.

(10) Patent No.: US 8,336,969 B2
(45) Date of Patent: Dec. 25, 2012

(54) BRAKE APPARATUS

(75) Inventors: Kazumoto Sano, Chuo (JP); Takuya Usui, Novi, MI (US); Hideaki Ishii, Minami-Alps (JP)

(73) Assignee: Hitachi, Ltd., Tokyo (JP)

( * ) Notice: Subject to any disclaimer, the term of this patent is extended or adjusted under 35 U.S.C. 154(b) by 886 days.

(21) Appl. No.: 12/356,741

(22) Filed: Jan. 21, 2009

(65) Prior Publication Data
US 2009/0183958 A1 Jul. 23, 2009

(30) Foreign Application Priority Data

Jan. 22, 2008 (JP) ................ 2008-011708

(51) Int. Cl.
*B60T 8/32* (2006.01)
(52) U.S. Cl. ....................................... 303/191
(58) Field of Classification Search .......... 303/10–11, 303/194–196, 191–192, 15–16
See application file for complete search history.

(56) References Cited

U.S. PATENT DOCUMENTS

| | | | |
|---|---|---|---|
| 6,899,403 B2 | 5/2005 | Isono et al. | |
| 6,969,162 B2 * | 11/2005 | Silverbrook et al. | 347/85 |
| 2003/0132665 A1 * | 7/2003 | Koyama | 303/116.1 |
| 2006/0015239 A1 * | 1/2006 | Higuchi | 701/72 |
| 2008/0058162 A1 * | 3/2008 | Schmidt | 477/184 |

FOREIGN PATENT DOCUMENTS

| | | |
|---|---|---|
| JP | 7-12145 | 1/1995 |
| JP | 7-32991 | 2/1995 |
| JP | 7-197964 | 8/1995 |
| JP | 11-336809 | 12/1999 |
| JP | 2003-34244 | 2/2003 |
| JP | 2003-154931 | 5/2003 |
| JP | 2005067245 A * | 3/2005 |

OTHER PUBLICATIONS

JPO electronic translation of JP2005-67245A.*
Japanese Office Action (with English translation) issued May 30, 2012 in corresponding Japanese Patent Application No. 2008-011708.

* cited by examiner

*Primary Examiner* — Robert A Siconolfi
*Assistant Examiner* — Anna Momper
(74) *Attorney, Agent, or Firm* — Wenderoth, Lind & Ponack, LLP

(57) ABSTRACT

In the normal condition, a braking force is generated by directly supplying to a disk brake a fluid pressure generated in a master cylinder in response to an operation of a brake pedal. In addition, a braking force can be generated by supplying a fluid pressure to the disk brake by actuating a hydraulic pump motor by a controller. When a knock-back occurs due to, for example, rapid turning of a vehicle, a piston is allowed to be displaced backward so that uneven wear of a brake pad and a disk rotor can be prevented. After that, when a cause for the knock-back is eliminated, the piston is caused to move forward and a pad clearance is adjusted by actuating the pump motor by the controller so that deterioration of the responsiveness can be prevented.

20 Claims, 11 Drawing Sheets

US 8,336,969 B2

BRAKE APPARATUS

BACKGROUND OF THE INVENTION

The present invention relates to a brake apparatus for use in a vehicle.

In a brake apparatus for use in a vehicle such as an automobile, when a great load is imposed on a wheel due to, for example, rapid turning of the vehicle, the disk rotor of the disk brake may be tilted and thereby the brake pad may be pushed back, whereby the pusher of the disk brake such as a piston may move away from the disk rotor, i.e., a so-called knock-back may occur. In addition, when a vehicle is running on a rough road or a rough surface and therefore the wheel and its peripheral components violently vibrate, the brake caliper may be displaced and the brake pad may come to contact the disk rotor, thereby causing a knock-back as mentioned above. Such a knock-back often leads problems. When a knock-back occurs, a pad clearance is increased and thereby responsiveness of the brake apparatus is deteriorated, and in addition to that, irregular contact between the disk rotor and the brake pad easily causes uneven wear of the disk rotor and the brake pad.

With the aim of solving this problem, for example, Japanese Patent Public Disclosure No. 2003-154931 discloses an invention in which an increase of the pad clearance and therefore deterioration of responsiveness of the brake apparatus can be prevented by maintaining the position of the piston in the brake caliper as measures against knock-back.

However, the invention disclosed in the above-mentioned Japanese Patent Public Disclosure No. 2003-154931 still has the following drawback; since the position of the pusher in the brake caliper is maintained against a knock-back, i.e., displacement of the pusher of the disk brake away from the disk rotor, irregular contact of the disk rotor to the brake pad is unavoidably made, whereby uneven wear of the disk rotor and the brake pad may be deteriorated and the brake judder phenomenon may be caused.

SUMMARY OF THE INVENTION

The present invention has been contrived in consideration of the above-mentioned circumstances, and an object thereof is to provide a brake apparatus in which, even with occurrence of a knock back meaning a movement of a pusher of a disk brake away from a disk rotor, deterioration of responsiveness of the brake apparatus can be prevented, and at the same time, uneven wear of the disk rotor and a brake pad can be prevented.

To achieve the forgoing and other objects, the present invention is to provide a brake apparatus comprising a braking mechanism operable to actuate a pusher adapted to push a brake pad against a disk rotor of a vehicle, and a controller operable to control the braking mechanism in response to an operation of a brake pedal and also operable to control the braking mechanism independently from an operation of the brake pedal, the brake apparatus wherein: the brake apparatus further comprises a detector operable to detect a retraction which means that the pusher moves away from the disk rotor, when braking is not in operation; and after the retraction of the pusher is detected based on a detection result of the detector, when a cause for the retraction is eliminated, the controller causes the pusher to move close to the disk rotor by the braking mechanism.

DETAILED DESCRIPTION OF THE INVENTION

Hereinafter, preferred embodiments of the present invention will be described in detail based on the accompanying drawings.

Figure 1:
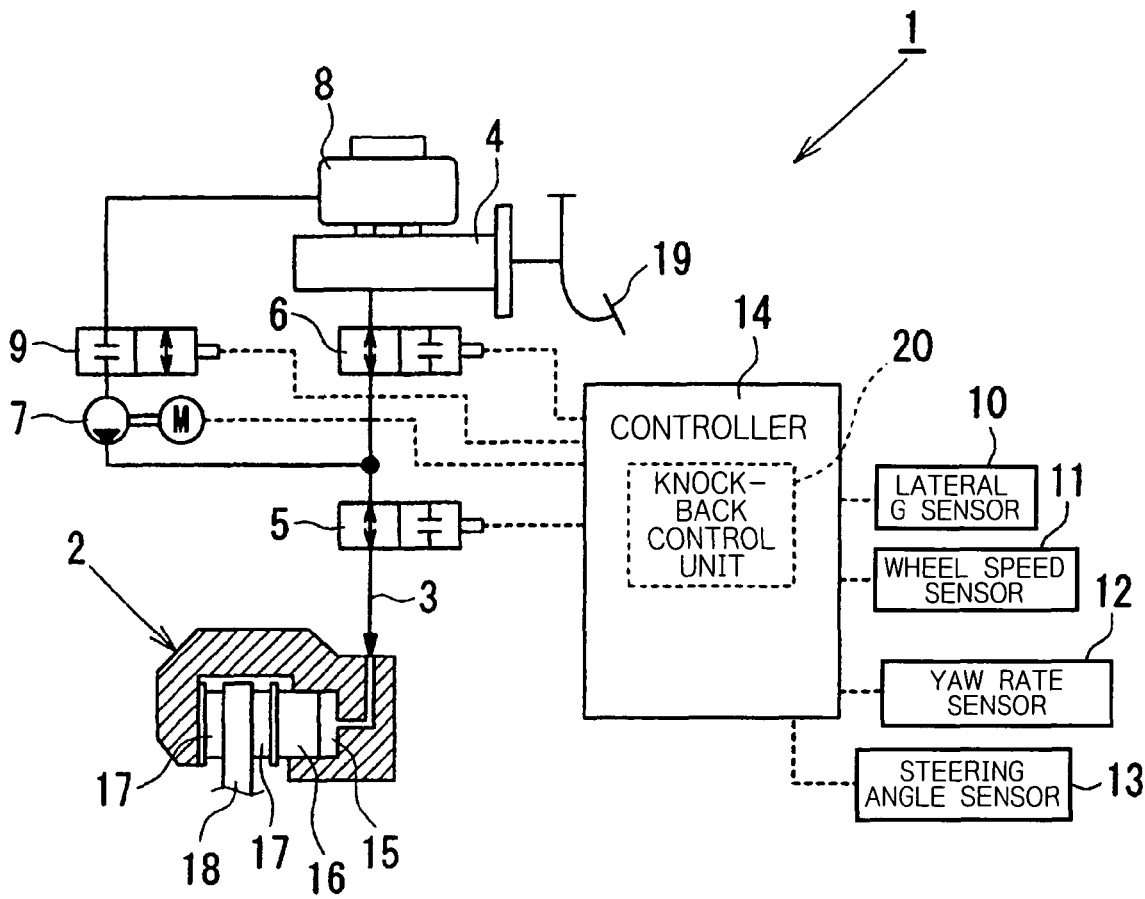
FIG. 1 is a block diagram schematically illustrating a structure of a brake apparatus according to a first embodiment of the present invention.

A first embodiment of the present invention will be described with reference to FIGS. 1 to 4. FIG. 1 is a schematic diagram of a structure of a brake apparatus according to the first embodiment. As shown in FIG. 1, a brake apparatus 1 comprises a disk brake 2 mounted on each wheel (only one wheel shown), a master cylinder 4 connected to the disk brake 2 via a pipeline 3, a pressure increasing valve 5 and a cutoff (shutoff)valve 6 disposed on the pipeline 3, a hydraulic pump motor 7 connected between the pressure increasing valve 5 and the cutoff valve 6 on the pipeline 3, a supply valve 9 disposed between the pump motor 7 and the reservoir 8, and various sensors (detectors) for detecting a vehicle condition such as a lateral acceleration sensor 10, a vehicle speed sensor 11, a yaw rate sensor 12 and a steering angle sensor 13. The brake apparatus further comprises a controller 14 (controller) for controlling the pressure increasing valve 5, the cutoff valve 6, the pump motor 7 and the supply valve 9 based on the detection results of the various sensors. In the present embodiment, the master cylinder 4 and the pipeline 3 embody a first braking mechanism or a main braking mechanism of the present invention. The pressure increasing valve 5 and the cutoff valve 6 disposed on the pipeline 3, and the pump motor 7 corresponding to a hydraulic pump in the present invention embody a second braking mechanism or a sub braking mechanism of the present invention.

The disk brake 2 is a conventional fluid pressure disk brake, in which a supply of a fluid pressure into a cylinder 15 causes a forward movement of the piston 16 (pusher), and then a brake pad 17 is pressed against a disk rotor 18 rotating with a wheel (not shown), as a result of which a braking force is generated.

The master cylinder 4 is adapted to generate a fluid pressure to be supplied to the disk brake 2 in response to an operation of a brake pedal 19. A booster such as a vacuum booster may be provided to the master cylinder 4 if necessary, so that the brake can be operated by a reduced operation force of the brake pedal 19.

The pressure increasing valve 5 and the cutoff valve 6 are normally open electromagnetic on-off valves adapted to open and close the pipeline 3 in response to a control signal from the controller 14. The hydraulic pump motor 7 is an integrated combination of a hydraulic pump and an electric motor, and is actuated upon receiving a control signal from the controller 14 to generate a fluid pressure to be supplied from the reservoir 8 to the disk brake 2. The supply valve 9 is a normally closed electromagnetic on-off valve adapted to open and close the pipeline for supplying a brake fluid from the reservoir 8 to the pump motor 7 upon receiving a control signal from the controller 14.

The controller 14 receives detection results from the various sensors for detecting a vehicle condition, such as the lateral acceleration sensor 10, the vehicle speed sensor 11 and the yaw rate sensor 12. The controller 14 then outputs control signals based on the received detection results to the pressure increasing valve 5, the cutoff valve 6, the pump motor 7 and the supply valve 9, and controls an operation of the disk brake 2 in the following manner.

(Normal Brake Operation Actuated by a Driver)

Under a normal condition, the controller 14 does not output control signals (control electric current) to the pressure increasing valve 5, the cutoff valve 6, the pump motor 7 and the supply valve 9. The pressure increasing valve 5 and the cutoff valve 6 are opened, the pump motor 7 is stopped, and the supply valve 9 is closed. When a driver operates the brake pedal 19 in this state, a fluid pressure generated in the master cylinder 4 is supplied to the cylinder 15 of the disk brake 2 through the pipeline 3, which then causes the piston 16 to push the brake pad 17 against the disk rotor 18. As a result, a braking force is generated according to the force operating the brake pedal 1.

(Brake Control by the Controller)

The controller 14 disconnects the master cylinder 4 from the disk brake 2 by outputting a control signal to close the cutoff valve 6. The controller 14 also opens the supply valve 9 and actuates the pump motor 7 by outputting control signals, and then a fluid pressure generated by the pump motor 7 is supplied to the cylinder 15 of the disk brake 2. Due to this operation of the controller 14, a braking force can be generated without an operation of the brake pedal 19. In addition, the controller 14 can maintain the fluid pressure in the cylinder 15 of the disk brake 2 by closing the pressure increasing valve 5. The controller 14 can also reduce the fluid pressure in the cylinder of the disk brake 2 by opening the pressure increasing valve 5, stopping the pump motor 7 and opening the cutoff valve 6. Therefore, a braking force of the disk brake 2 for each wheel can be controlled according to a vehicle condition. For example, the antilock control, the traction control, and the vehicle stability control can be performed.

Further, the controller 14 includes a knock-back control unit 20, which performs a knock-back control as will be described below.

(Knock-Back Detection)

When a large lateral acceleration (for example, a lateral acceleration equal to or more than 3 m/s$^2$) occurs in the vehicle while the vehicle is turning, the disk rotor 18 is tilted under the influence of a lateral force acting on the wheel, whereby the piston 16 is pushed back via the brake pad 17 and a retraction which means that the piston 16 moves away from the disk rotor 18, i.e., a knock-back may occur. At this time, the knock-back control unit 20 determines occurrence of the above-mentioned retraction, i.e., the knock-back based on the detection value of the lateral acceleration sensor 10 when the lateral acceleration exceeds a predetermined threshold value. After that, when the lateral acceleration becomes equal to or lower than the predetermined threshold, the unit 20 determines that the lateral force acting on the wheel is reduced, and the tilted disk rotor 18 returns to the original position, and therefore a cause for the above-mentioned retraction, i.e., the knock-back is eliminated. Then, the unit 20 analyses the vehicle running condition based on the detection results of the sensors such as the wheel speed sensor 11, the yaw rate sensor 12 and the steering angle sensor after determining the elimination of the cause for the knock-back. As a result of the analysis, if the unit 20 determines that the vehicle is running in the normal running condition that does not cause a knock-back (for example, the vehicle is running straight), the unit 20 causes the piston 16 retracted by the knock-back to move forward to be closer to the disk rotor 18 by supplying a fluid pressure to the cylinder 15 of the disk brake 2 with use of the pump motor 7. Then, a pad clearance adjustment operation is performed.

(Pad Clearance Adjustment)

Figure 2:
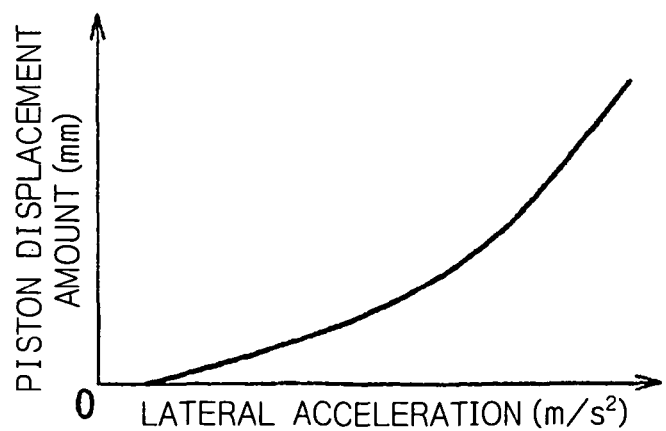
FIG. 2 shows a graph representing the relationship between the displacement amount of a piston of a disk brake by a knock-back and the lateral acceleration of a vehicle, with regard to the brake apparatus shown in FIG. 1.
Figure 3:
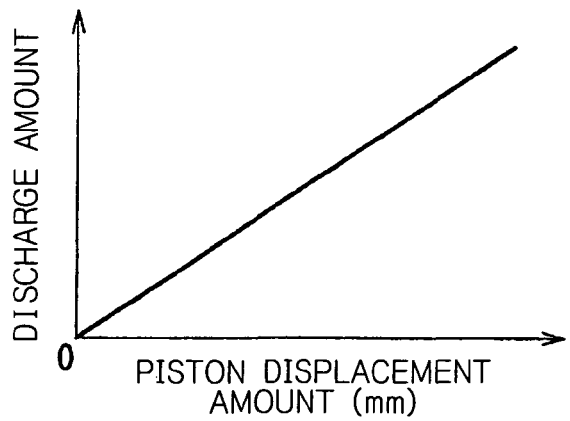
FIG. 3 shows a graph representing the relationship between the discharge amount from a hydraulic pump motor and the displacement amount of the piston of the disk brake, with regard to the brake apparatus shown in FIG. 1.

The pad clearance adjustment can be performed in the following manner. As shown in FIG. 2, the relationship between the lateral acceleration acting on the vehicle body when a knock-back occurs and the backward displacement amount of the piston 16 (an amount of brake fluid discharged from the cylinder 15) is determined in advance based on a test, an experiment or the like. In addition, as shown in FIG. 3, the relationship between the displacement amount of the piston 16 upon a supply of brake fluid to the cylinder 15 of the disk brake 2 from the pump motor 7, and the discharge amount of the brake fluid from the pump motor 7 (for example, rotation number (rpm)×operation time) is determined in advance based on, for example, the characteristics of the pump motor 7. Based on the graphs of FIGS. 2 and 3, the pad clearance control is performed by supplying the brake fluid from the pump motor 7 to the cylinder 15 of the disk brake 2 to cause a forward movement of the piston 16 so that an appropriate pad clearance is accomplished.

Figure 4:
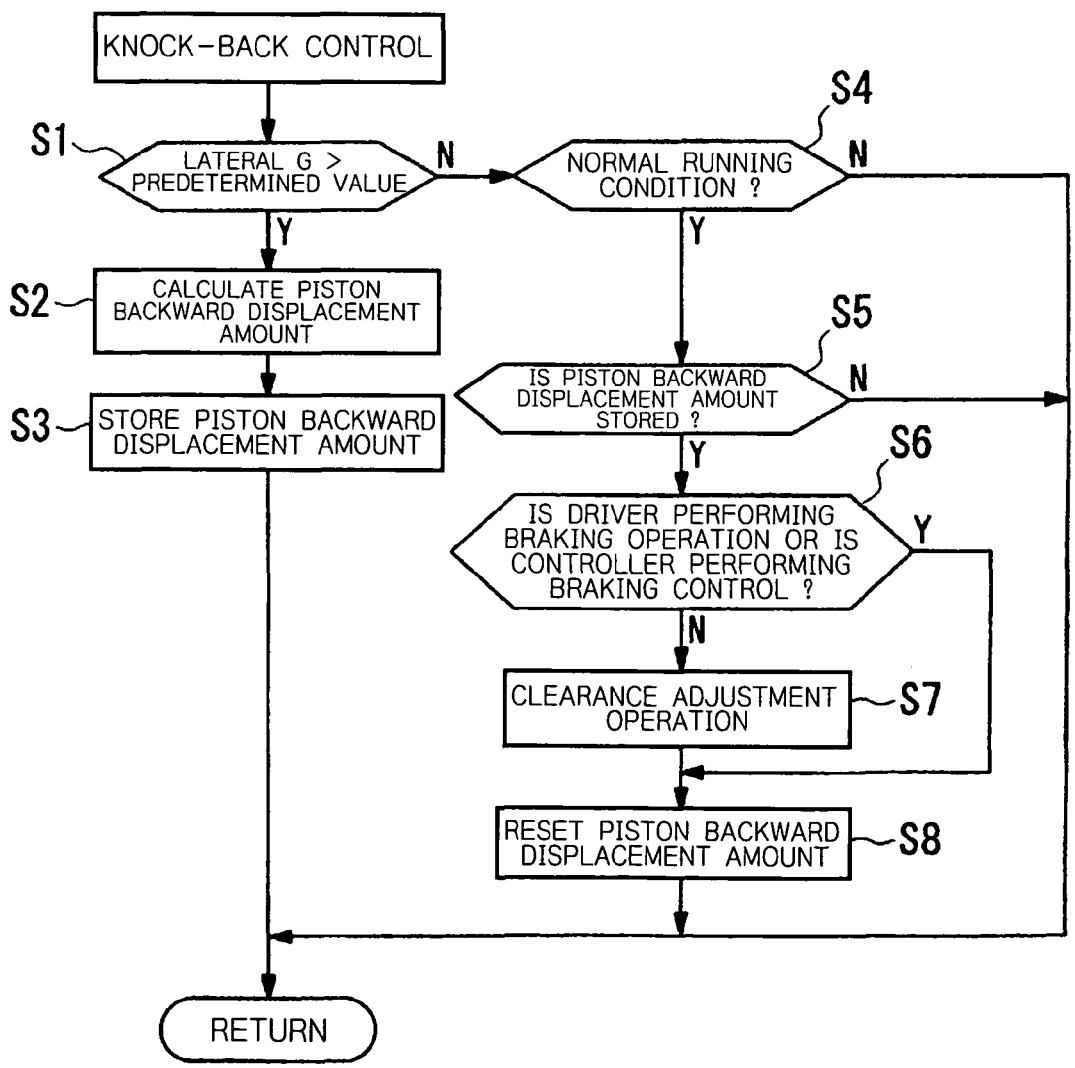
FIG. 4 shows a flow chart of a control performed by a knock-back control unit of a controller of the brake apparatus shown in FIG. 1.

More specifically, the knock-back control performed by the knock-back control unit 20 will be described with reference to the flowchart shown in FIG. 4. Referring to FIG. 4, at step S1, it is determined whether a vehicle is in the turning condition that causes a retraction which is a movement of the piston 16 away from the disk rotor 18, i.e., a knock-back, by determining whether a lateral acceleration detected by the lateral acceleration sensor 10 exceeds the predetermined threshold value. If the lateral acceleration exceeds the threshold value, then the flow proceeds to step S2. At step S2, a backward displacement amount of the piston 16 is calculated from the graph of FIG. 2 based on the detection value detected by the lateral acceleration sensor 10. Then at step S3, the calculated backward displacement amount of the piston 16 is stored.

If it is determined at step S1 that the lateral acceleration does not exceed the threshold value, then the flow proceeds to step S4. At step S4, it is determined whether the vehicle is running in the normal condition that does not cause a knock-back (for example, the vehicle is running straight), by analyzing the vehicle running condition based on the detection results of the wheel speed sensor 11, the yaw rate sensor 12, the steering angle sensor 13 and the like. If it is determined at step S4 that the vehicle is not running in the normal condition, i.e., the vehicle is turning or swiveling, then the current routine is ended. If it is determined at step S4 that the vehicle is running in the normal condition, then the flow proceeds to step S5. At step S5, it is determined whether the backward displacement amount of the piston 16 is stored. If it is determined at step S5 that the backward displacement amount of the piston 16 is not stored, then it is determined that the vehicle has not returned from the turning condition causing a knock-back to the normal running condition, and the current routine is ended. If it is determined at step S5 that the backward displacement amount of the piston 16 is stored, then it is determined that the vehicle has returned from the turning condition causing a knock-back to the normal running condition, i.e., a cause for the retraction which is a movement of the piston 16 away from the disk rotor 18 is eliminated, and the flow proceeds to step S6. At step S6, it is determined whether the driver is performing a braking operation, or whether the controller 14 is performing any braking-related control such as the anti-lock control, the traction control or the vehicle stability control.

If it is determined at step 6 that the driver is not performing a braking operation and the controller 14 is not performing a braking-related control, then the flow proceeds to step S7. At step S7, the pad clearance adjustment is performed by adjusting a discharge amount of the brake fluid from the pump motor 7 according to the backward displacement amount of the piston 16 stored at step S3, and causing the piston 16 to move forward accordingly to be closer to the disk rotor 18. Then, at step S8, the memory of the backward displacement amount of the piston 16 is reset, and the current routine is ended. If it is determined at step S6 that the driver is performing a braking operation or the controller 14 is performing a braking-related control, then the flow proceeds to step S8. At step S8, the memory of the backward displacement amount of the piston 16 is reset, and the current routine is ended. At this time, since the controller 14 performs a braking-related control for each wheel, the pad clearance adjustment at step S7 is not performed on a wheel receiving a braking-related control, if any.

In this way, when a retraction which is a movement of the piston 16 away from the disk rotor 18, i.e., a knock-back occurs during the non-braking condition, especially during the turning condition, the piston 16 is allowed to be displaced backward so that uneven wear of the brake pad 17 and the disk rotor 18 can be prevented. Then, when a cause of the above-mentioned retraction, i.e., the knock-back is eliminated and the vehicle running condition returns to normal, the piston 16 is caused to move forward to be closer to the disk rotor 18, and the pad clearance is appropriately adjusted so that deterioration of the responsiveness of the brake apparatus 1 is prevented. In this embodiment, a braking mechanism operable to displace the piston 16 corresponding to a pusher regardless of operation of the brake pedal 19 is embodied by the barking mechanism comprising the pressure increasing valve 5 and the cutoff valve 6 disposed on the pipeline 3, and the pump motor 7. However, it may be embodied by a braking mechanism that is a hydraulic mechanism including a control-type vacuum booster containing an actuator such as a solenoid valve and operable to push the piston of the master cylinder by being actuated by the actuator. In this case, these control-type vacuum booster and master cylinder correspond to a hydraulic pump of the present invention. It should be noted that the above-mentioned control-type vacuum booster may be replaced with any booster which can be operable regardless of operation of the brake pedal, such as a hydraulic booster or an electric booster.

In the present embodiment, a detector operable to detect a retraction which is a movement of the piston 16 away from the disk rotor 18 based on the vehicle turning condition is embodied by the lateral acceleration sensor 10. However, instead of the lateral acceleration sensor 10, it may be embodied by the yaw rate sensor 12, or the combination of the vehicle speed sensor 11 and the steering angle sensor 13. In the present embodiment, a retraction amount calculator operable to calculate a degree of a movement of the piston 16 away from the disk rotor 18 at the retraction is embodied by the lateral acceleration sensor 10 and the knock-back control unit 20. However, instead of the lateral acceleration sensor 10, it may be embodied by the knock-back control unit 20, and the yaw rate sensor 12 or the combination of the vehicle speed sensor 11 and the steering sensor 13.

Next, a second embodiment of the present invention will be described with reference to FIGS. 5 to 8. In the following description of the second embodiment, like components are denoted by like reference numerals as of the first embodiment, and only components and features different from or absent in the first embodiment will be described in detail.

Figure 5:
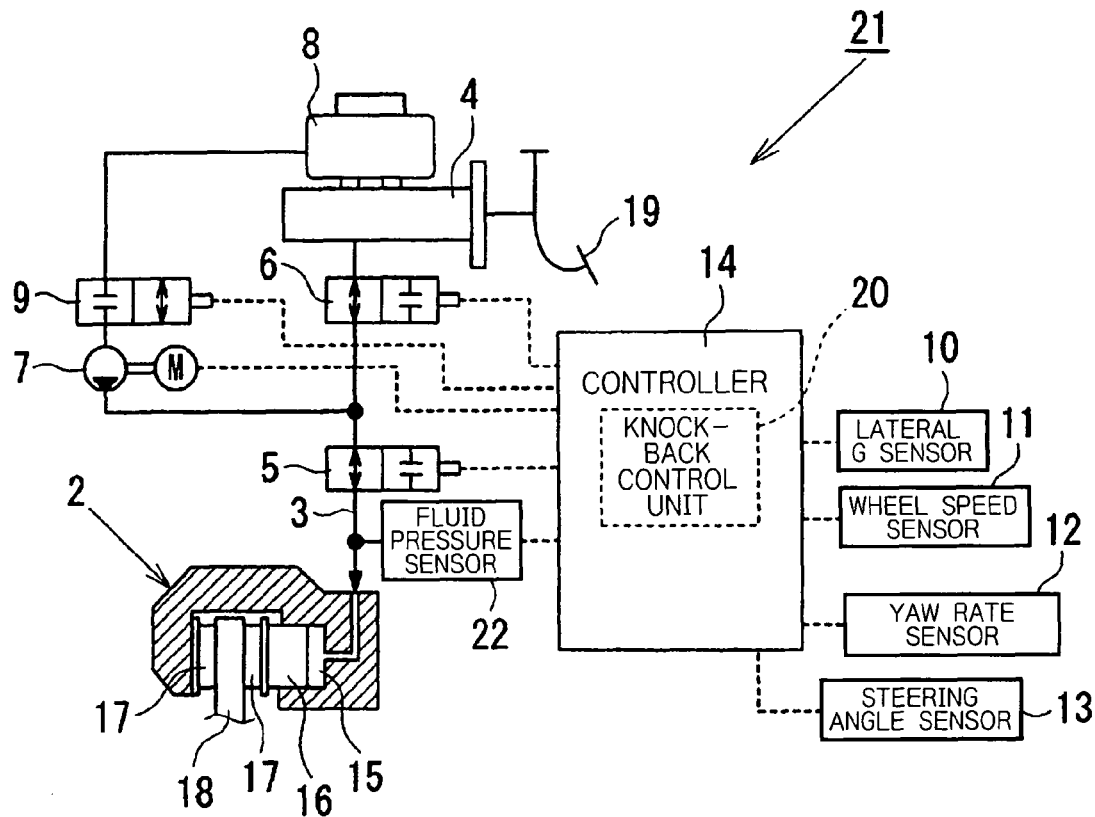
FIG. 5 is a block diagram schematically illustrating a structure of a brake apparatus according to a second embodiment of the present invention.

As shown in FIG. 5, a brake apparatus 21 according to the second embodiment comprises a fluid pressure sensor 22 operable to detect a fluid pressure in the cylinder 15 of the disk brake 2. The knock-back control unit 20 of the controller 14 performs a knock-back control based on a detection result of the fluid pressure sensor 22 in the following manner.
(Knock-Back Detection)

Figure 6:
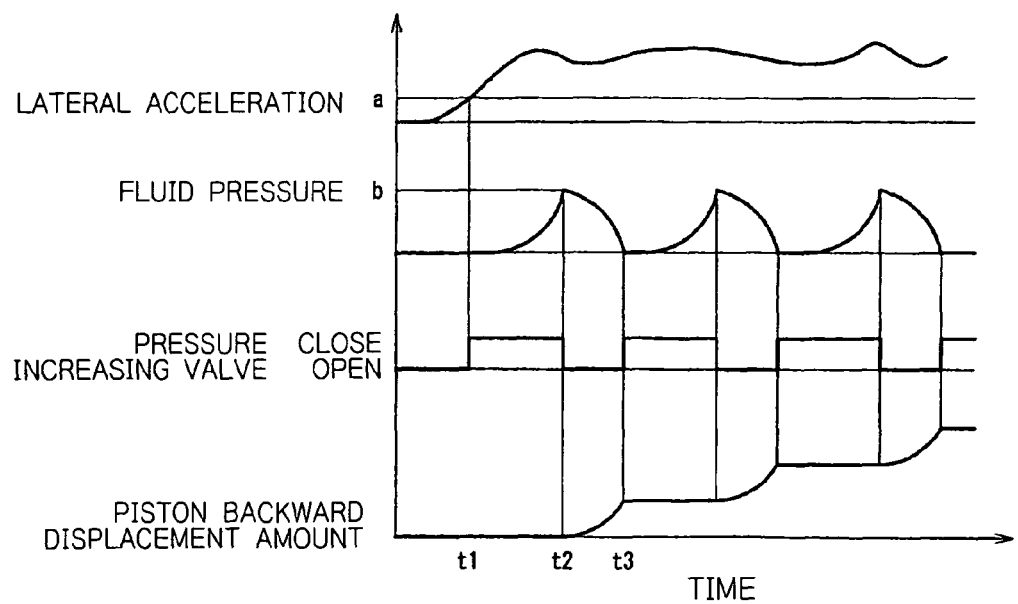
FIG. 6 shows a time chart illustrating a control performed by a knock-back control unit of a controller, with regard to the brake apparatus shown in FIG. 5.

The knock-back control performed by the knock-back control unit 20 will be described with reference to the time chart shown in FIG. 6. The knock-back control unit 20 determines that there is possibility of occurrence of a retraction which is a movement of the piston 16 away from the disk rotor 18, i.e., a knock-back, based on the detection result of the lateral acceleration sensor 10 when the lateral acceleration exceeds a predetermined threshold value "a". Once this determination is made, the knock-back control unit 20 closes the pressure increasing valve 5, and starts to monitor the fluid pressure in the cylinder 15 of the disk brake 2 with use of the fluid pressure sensor 22 (time t1). The disk rotor 18 is tilted under the influence of a lateral force acting on the wheel, and therefore the piston 16 is pushed back through the brake pad 17 and moves away from the disk rotor 18. At this time, the fluid pressure in the cylinder 15 of the disk brake 2 is increased since the pressure increasing valve 5 is closed. When the fluid pressure in the cylinder exceeds a predetermined fluid pressure threshold value "b" (or when the time integration of the change in the fluid pressure exceeds a predetermined threshold value), it is determined that a retraction which is a movement of the piston 16 away from the disk rotor 18, i.e., a knock-back actually occurs (time t2). If the knock-back occurrence is determined, the unit 20 opens the pressure increasing valve 5 for a certain time to release the fluid pressure in the cylinder 15. After that, the unit 20 closes the pressure increasing valve 5 again, restarts to monitor the fluid pressure in the cylinder 15 (time t3), and repeats these processes.

After that, when the lateral acceleration becomes equal to or lower than the threshold value "a", it is determined that a cause for the retraction which is a movement of the piston 16 away from the disk rotor 18. i.e., the knock-back is eliminated. Then, after determining that the cause for the knock-back is eliminated, the unit 20 analyzes the vehicle running condition based on the detection results of the wheel speed sensor 11, the yaw rate sensor 12, the steering angle sensor and the like. When the unit 20 determines that the vehicle is running in the normal running condition which does not cause a knock-back (for example, the vehicle is running straight), the unit 20 causes the piston 16 retracted by the knock-back to move forward to be closer to the disk rotor 18 by supplying a fluid pressure into the cylinder 15 of the disk brake 2 with use of the pump motor 7, and then performs the pad clearance adjustment.

(Pad Clearance Adjustment)

Figure 7:
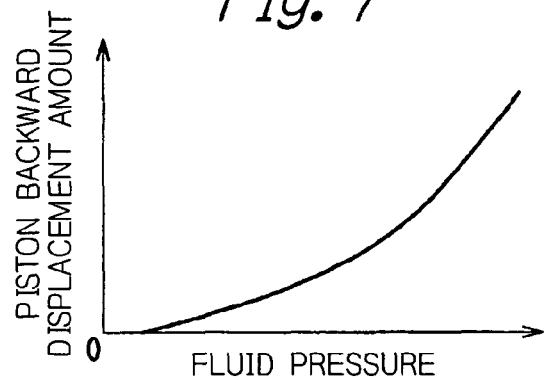
FIG. 7 shows a graph representing the relationship between the displacement amount of a piston of a disk brake by a knock-back and the fluid pressure in a cylinder, with regard to the brake apparatus shown in FIG. 5.

The pad clearance adjustment can be performed in the following manner. As shown in FIG. 6, the backward displacement amount of the piston 16 by the knock-back is increased each time the pressure increasing valve 5 is opened and the fluid pressure in the cylinder 15 is released after the fluid pressure in the cylinder 15 exceeds the fluid pressure threshold value "b". Therefore, the backward displacement amount of the piston 16 can be calculated and determined by counting how many times the pressure increasing valve 5 is opened after it is determined that the knock-back occurs. Alternatively, as shown in FIG. 7, the relationship between the fluid pressure in the cylinder 15 and the backward displacement amount of the piston 16 is preset based on a test, an experiment or the like, so that the backward displacement amount of the piston 16 can be calculated and determined by monitoring the fluid pressure in the cylinder 15 with use of the fluid pressure sensor 22. After the backward displacement amount of the piston 16 by the knock-back is determined in this way, as in the first embodiment, brake fluid is supplied into the cylinder 15 with use of the pump motor 7 by an amount calculated from the relationship between the displacement amount of the piton and the discharge amount of the brake fluid from pump motor 7 shown in FIG. 3. The piston 16 is caused to move forward to be closer to the disk rotor 18 and the pad clearance adjustment is performed in this way.

Figure 8:
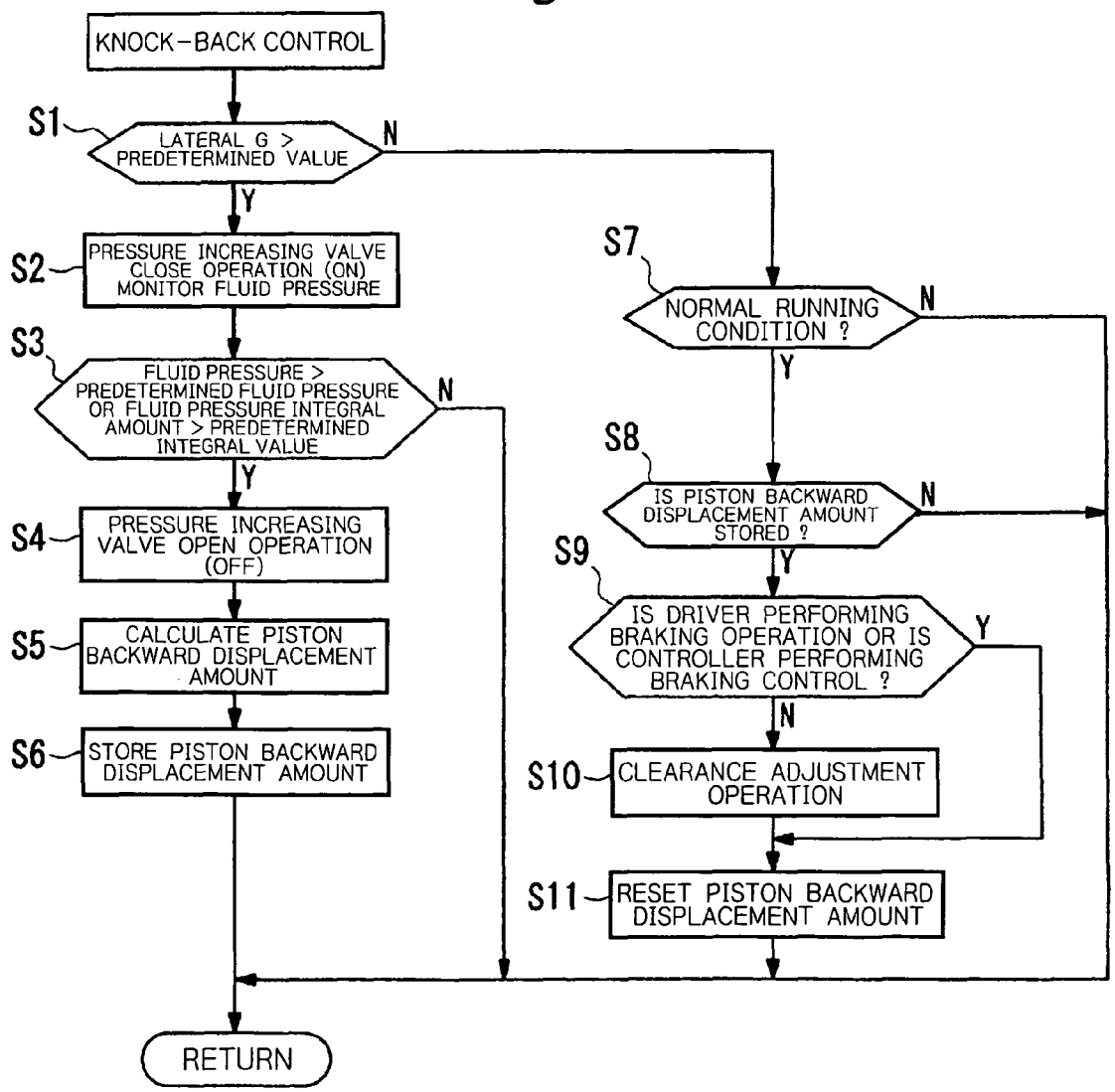
FIG. 8 shows a flow chart of the control performed by the knock-back control unit of the controller of the brake apparatus shown in FIG. 5.

More specifically, the knock-back control performed by the knock-back control unit 20 will be described with reference to the flowchart shown in FIG. 8. Referring to FIG. 8, at step S1, it is determined whether the vehicle is in the turning condition that may cause a retraction which is a movement of the piston 16 away from the disk rotor 18, i.e., a knock-back, by determining whether the lateral acceleration detected by the lateral acceleration sensor 10 exceeds the predetermined threshold value "a". If the detected lateral acceleration exceeds the threshold value, then the flow proceeds to step S2. At step S2, the pressure increasing valve 5 is closed and the unit 20 starts to monitor the fluid pressure in the cylinder 15 of the disk brake 2 with use of the fluid pressure sensor 22, then the flow proceeds to step S3.

At step S3, it is determined whether the fluid pressures in the cylinder 15 exceeds the predetermined fluid pressure threshold value "b". If the fluid pressure in the cylinder 15 exceeds the fluid pressure threshold value "b", then it is determined that a retraction which is a movement of the piston 16 away from the disk rotor 18, i.e., a knock-back occurs, and the flow proceeds to step S4. At step S4, the pressure increasing valve is opened. At step S5, the backward displacement amount of the piston 16 is calculated based on the frequency of opening of the pressure increasing valve 5 or the fluid pressure in the cylinder 15. Then, the determined backward displacement amount of the piston 16 is stored at step S6, and the current routine is ended. If it is determined at step S3 that the fluid pressure in the cylinder 15 does not exceed the fluid pressure threshold value "b", then it is determined that a knock-back does not occur, and the current routine is ended.

On the other hand, if it is determined at step S1 that the lateral acceleration does not exceed the threshold value "a", the flow proceeds to step S7. At step S7, the vehicle running condition is analyzed based on the detection results of the vehicle speed sensor 11, the yaw rate sensor 12, the steering angle sensor 13 and the like, and it is determined whether the vehicle is running in the normal condition which does not cause a knock-back (for example, the vehicle is running straight). If it is determined at step S7 that the vehicle is not running in the normal condition, then the current routine is ended. If it is determined at step S7 that the vehicle is running in the normal condition, then the flow proceeds to step S8. At step S8, it is determined whether the backward displacement amount of the piston 16 is stored. If it is determined at step S8 that the backward displacement amount of the piston 16 is not stored, then the current routine is ended. If it is determined at step S8 that the backward displacement amount of the piston 16 is stored, then it is determined that the vehicle has returned from the turning condition causing the knock-back to the normal running condition, i.e., the cause for the retraction which is a movement of the piston 16 away from the disk rotor 18 is eliminated. Then, the flow proceeds to step S9. At step S9, it is determined whether the driver is performing a braking operation or whether the controller 14 is performing any braking-related control such as the anti-lock control, the traction control or the vehicle stability control.

If it is determined at step 9 that the driver is not performing a braking operation or the controller 14 is not performing a braking-related control, then the flow proceeds to step S10. At step S10, the pad clearance adjustment is performed by adjusting a discharge amount of the brake fluid from the pump motor 7 according to the backward displacement amount of the piston 16 stored at step S6, and causing the piston 16 to move forward to be closer to the disk rotor 18. Then, the flow proceeds to step S11 and the memory of the backward displacement amount of the piston 16 is reset, and the current routine is ended. If it is determined at step S9 that the driver is performing a braking operation or the controller 14 is performing a braking-related control, then the flow proceeds to step S11. At step S11, the memory of the backward displacement amount of the piston 16 is reset, and then, the current routine is ended. At this time, since the controller 14 performs a braking-related control for each wheel, the pad clearance adjustment at step S10 is not performed on a wheel receiving a braking-related control, if any.

In this way, when a retraction which is a movement of the piston 16 away from the disk rotor 18, i.e., a knock-back occurs during the non-braking condition, especially during the turning condition, the piston 16 is allowed to be displaced backward so that uneven wear of the brake pad 17 and the disk rotor 18 can be prevented. Then, when a cause for the abovementioned retraction, i.e., the knock-back is eliminated and the vehicle running condition returns to normal, the piston 16 is caused to move forward to be closer to the disk rotor 18, and the pad clearance is appropriately adjusted so that deterioration of the responsiveness of the brake apparatus 21 is prevented.

In the present embodiment, the fluid pressure sensor 22 serves as a detector for detecting a retraction which is a movement of the piston 16 away from the disk rotor 18 based on a turning condition of the vehicle, a displacement amount calculator, and a fluid pressure detector. However, a retraction which is a movement of the piston 16 away from the disk rotor 18 may be detected based on the fluid amount in the cylinder 15 detected by a combination of the fluid pressure sensor 22 and a counter operable to count how many times the pressure increasing valve 5 is opened. In this case, the combination of the fluid pressure sensor 22 and the counter operable to count how many times the pressure increasing valve 5 is opened corresponds to a displacement amount detector and a fluid amount detector.

Figure 9:
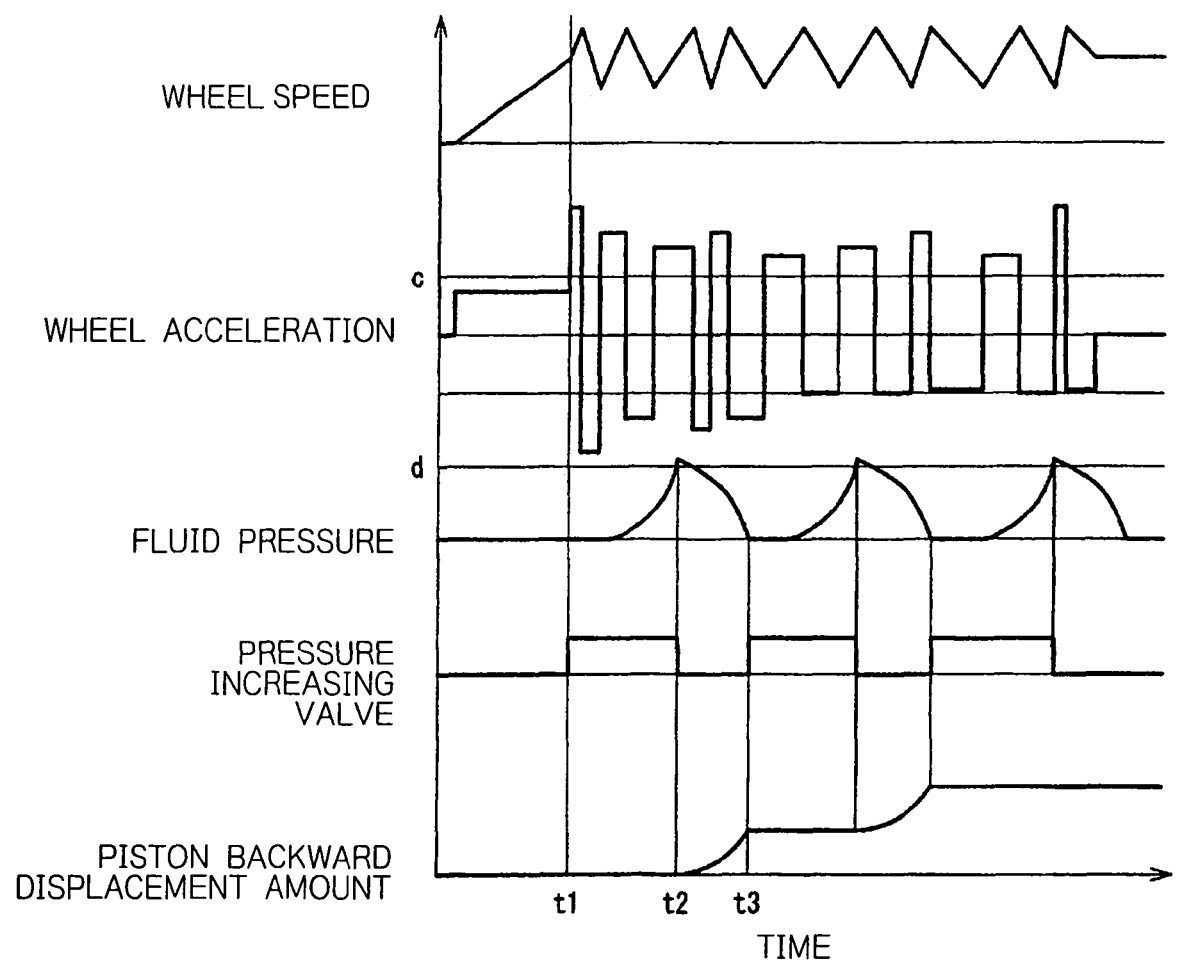
FIG. 9 shows a time chart illustrating a control performed by a knock-back control unit of a controller, with regard to a brake apparatus according to a third embodiment of the present invention.
Figure 10:
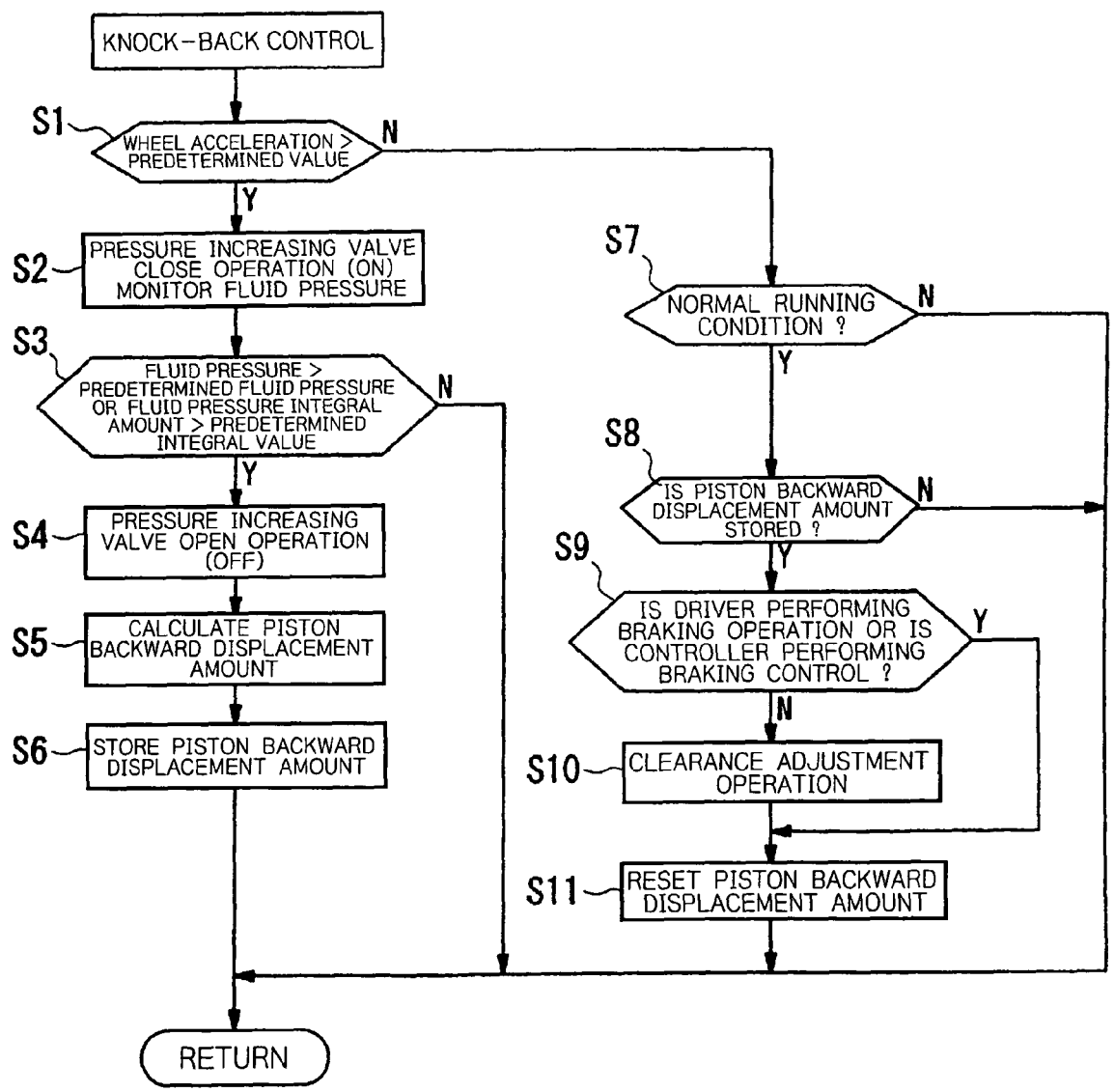
FIG. 10 shows a flow chart of the control performed by the knock-back control unit of the controller of the brake apparatus according to the third embodiment of the present invention.

Next, a third embodiment of the present invention will be described with reference to FIGS. 9 and 10. In the following description of the third embodiment, like components are denoted by like reference numerals as of the second embodiment, and only components and features different from or absent in the second embodiment will be described in detail.

A so called knock-back may occur when displacement of a brake caliper is caused by vibration of a wheel and its peripheral components due to, for example, running on a rough road or a rough surface, and the disk rotor 18 is tilted by contact of one of the brake pads 17 to the disk rotor 18, and the piston 16 is pushed back via the other brake pad 17 to move away from the disk rotor 18. A brake apparatus according to the present embodiment is to prevent deterioration of responsiveness and uneven wear of the disk rotor and the brake pads when such a knock-back occurs.

The brake apparatus according to the present embodiment is substantially similar to the brake apparatus according to the second embodiment shown in FIG. 5, except that the brake apparatus according to the present embodiment does not comprise the lateral acceleration sensor 10. In addition, the knock-back control unit 20 of the controller 14 performs the knock-back control in the following manner based on a detection result of the wheel speed sensor 11.

(Knock-Back Detection)

The knock-back control performed by the knock-back control unit 20 will be described with reference to the time chart shown in FIG. 9. When the vehicle is running on a rough road or a rough surface, the wheel bounds. At this time, the rotational speed of the wheel rapidly changes. The knock-back control unit 20 monitors the wheel speed detected by the wheel speed sensor 11, and determines that there is possibility of occurrence of a retraction which is a movement of the piston 16 away from the disk rotor 18, i.e., a knock-back when the change in the wheel speed (the absolute value of the wheel acceleration) exceeds a predetermined threshold value "c". The knock-back control unit 20 then closes the pressure increasing valve 5, and starts to monitor the fluid pressure in the cylinder 15 of the disk brake 2 with use of the fluid pressure sensor 22 (time t1). Displacement of the brake caliper is caused by vibration of the wheel and its peripheral components due to, for example, running on a rough road or rough surface, and the disk rotor 18 is tilted, and the piston 16 is pushed back via the brake pad 17 to move away from the disk rotor 18. At this time, since the pressure increasing valve 5 is closed, the fluid pressure in the cylinder 15 of the disk brake 2 is increased. Therefore, when the fluid pressure in the cylinder exceeds a predetermined threshold value "d" (or when the time integration of the fluid pressure exceeds a predetermined threshold value), the unit 20 determines that a retraction which is a movement of the piston 16 away from the disk rotor 18, i.e., a knock-back actually occurs (time t2). When the unit 20 determines occurrence of a knock-back, the unit 20 opens the pressure increasing valve 5 for a certain time to release the fluid pressure in the cylinder 15, and then closes the pressure increasing valve 5 again and restarts to monitor the fluid pressure in the cylinder 15 (time t3). The unit 20 repeats these processes.

After that, when the absolute value of the wheel acceleration remains equal to or less than the predetermined threshold value "c" for more than a certain time, it is determined that a cause for the retraction which is a movement of the piston 16 away from the disk rotor 18, i.e., the knock-back is eliminated. After it is determined that the cause for the knock-back is eliminated, the vehicle running condition is analyzed based on the detection results of the wheel speed sensor 11, the yaw rate sensor 12, the steering angle sensor and the like. If it is determined that the vehicle is running in the normal condition which does not cause a knock-back (for example, the vehicle is running straight), the unit 20 causes the piston 16 retracted by the knock-back to move forward to be closer to the disk rotor 18 by supplying a fluid pressure into the cylinder 15 of the disk brake 2 with use of the pump motor 7. Then, the pad clearance adjustment is performed.

(Pad Clearance Adjustment)

The pad clearance adjustment can be performed in the following manner. As shown in FIG. 9, the amount of the backward displacement of the piston 16 by the knock-back is increased each time the pressure increasing valve 5 is opened, and the fluid pressure in the cylinder 15 is released, after the fluid pressure in the cylinder 15 exceeds the fluid pressure threshold value "d". Therefore, the backward displacement amount of the piston 16 can be calculated and determined by counting how many times the pressure increasing valve 5 is opened after the determination of the knock-back occurrence. Alternatively, as shown in FIG. 7, the relationship between the fluid pressure in the cylinder 15 and the backward displacement amount of the piston 16 is preset based on a test, an experiment or the like, so that the backward displacement amount of the piston 16 can be calculated and determined by monitoring the fluid pressure in the cylinder 15 with use of the fluid pressure sensor 22. After the amount of the backward displacement of the piston 16 by the knock-back is determined in this way, as in the first embodiment, brake fluid is supplied into the cylinder 15 with use of the pump motor 7 by an amount calculated from the relationship between the displacement amount of the piton and the discharge amount of the brake fluid from pump motor 7 shown in FIG. 3. The unit 20 causes the piston 16 to move forward to be closer to the disk rotor 18 in this way and performs the pad clearance adjustment.

More specifically, the knock-back control performed by the knock-back control unit 20 will be described with reference to the flow chart shown in FIG. 10. Referring to FIG. 10, at step S1, it is determined whether the vehicle is running on a rough road or a rough surface that may cause a retraction which is a movement of the piston 16 away from the disk rotor 18, i.e., a knock-back, by monitoring the wheel speed detected by the wheel speed sensor 11 and determining whether the change in the wheel speed (the absolute value of the wheel acceleration) exceeds the predetermined threshold value "c". If the change in the wheel speed exceeds the threshold value, then flow proceeds to step S2. At step S2, the pressure increasing valve 5 is closed and monitoring of the fluid pressure in the cylinder 15 of the disk brake 2 detected by the fluid pressure sensor 22 is started. Then, the flow proceeds to step S3.

At step S3, it is determined whether the fluid pressure in the cylinder 15 exceeds the predetermined threshold value "d". If the fluid pressure in the cylinder 15 exceeds the fluid pressure threshold value "d", then it is determined that a retraction which is a movement of the piston 16 away from the disk rotor 18, i.e., a knock-back actually occurs, and the flow proceed to step S4. At step S4, the pressure increasing valve 5 is opened. At step S5, the backward displacement amount of the piston 16 is calculated based on how many times the pressure increasing valve is opened or the fluid pressure in the cylinder 15. Then, at step S6, the backward displacement amount of the piston 16 is stored, and the current routine is ended. If it is determined at step 3 that the fluid pressure in the cylinder 15 does not exceed the fluid pressure threshold value "d", then it is determined that a knock-back does not occur, and the current routine is ended.

On the other hand, if it is determined at step 1 that the absolute value of the wheel acceleration does not exceed the threshold value "c", then the flow proceeds to step S7. At step S7, it is determined whether the vehicle is running in the normal running condition that does not cause a knock-back (for example, the vehicle is running straight) by analysis of the vehicle running condition based on the detection results of the wheel speed sensor 11, the yaw rate sensor 12, the steering angle sensor 13 and the like. If it is determined at step S7 that the vehicle is not running in the normal condition, then the current routine is ended. If it is determined at step S7 that the vehicle is running in the normal condition, then the flow proceeds to step S8. At step S8, it is determined whether the backward displacement amount of the piston 16 is stored. If it is determined at step S8 that the backward displacement amount of the piston 16 is not stored, then the current routine is ended. If it is determined at step 8 that the backward displacement amount of the piston is stored, then it is determined the vehicle has returned from the turning condition causing a knock-back to the normal running condition, i.e., a cause for the retraction which is a movement of the piston 16 away from the disk rotor 18 is eliminated. Then, the flow proceeds to step S9. At step 9, it is determined whether the driver is performing a braking operation or whether the controller 14 is performing any braking-related control such as the anti-lock control, the traction control or the vehicle stability control.

If it is determined at step S9 that the driver is not performing a braking operation and the controller 14 is not performing a braking-related control, then the flow proceeds to step S10. The pad clearance adjustment is performed by adjusting a discharge amount of the brake fluid from pump motor 7 according to the backward displacement amount of the piston 16 stored at step S6 and causing the piston 16 to move forward to be closer to the disk rotor 18. At step S11, the memory of the backward displacement amount of the piston 16 is reset, and the current routine is ended. If it is determined at step S9 that the driver is performing a braking operation or the controller 14 is performing a braking-related control, then the flow proceeds to step S11. At step S11, the memory of the backward displacement amount of the piston 16 is reset and the current routine is ended. At this time, since the controller 14 performs a braking-related control for each wheel, the pad clearance adjustment at step 10 is not performed on a wheel receiving a braking-related control, if any.

In this way, when a retraction which is a movement of the piston 16 away from the disk rotor 18, i.e., a knock-back occurs during the non-braking condition, especially during running on a rough road or a rough surface, the piston 16 is allowed to be displaced backward so that uneven wear of the brake pad 17 and the disk rotor 18 can be prevented. Then, when a cause for the above-mentioned retraction, i.e., the knock-back is eliminated and the vehicle running condition returns to normal, the piston 16 is caused to move forward to be closer to the disk rotor 18, and the pad clearance is appropriately adjusted so that deterioration of the responsiveness of the brake apparatus 21 can be prevented.

In the present embodiment, the fluid pressure sensor 22 serves as a detector for detecting a retraction which is a movement of the piston 16 away from the disk rotor 18 based on a condition in which the vehicle is running on a rough road or a rough surface, a displacement amount calculator and a fluid pressure detector. However, a retraction which is a movement of the piston 16 away from the disk rotor 18 may be detected based on the fluid amount in the cylinder 15 detected by a combination of the fluid pressure sensor 22 and a counter operable to count how many times the pressure increasing valve 5 is opened. In this case, the combination of the fluid pressure sensor 22 and the counter operable to count how many times the pressure increasing valve 5 is opened corresponds to a displacement amount detector and a fluid amount detector.

Figure 11:
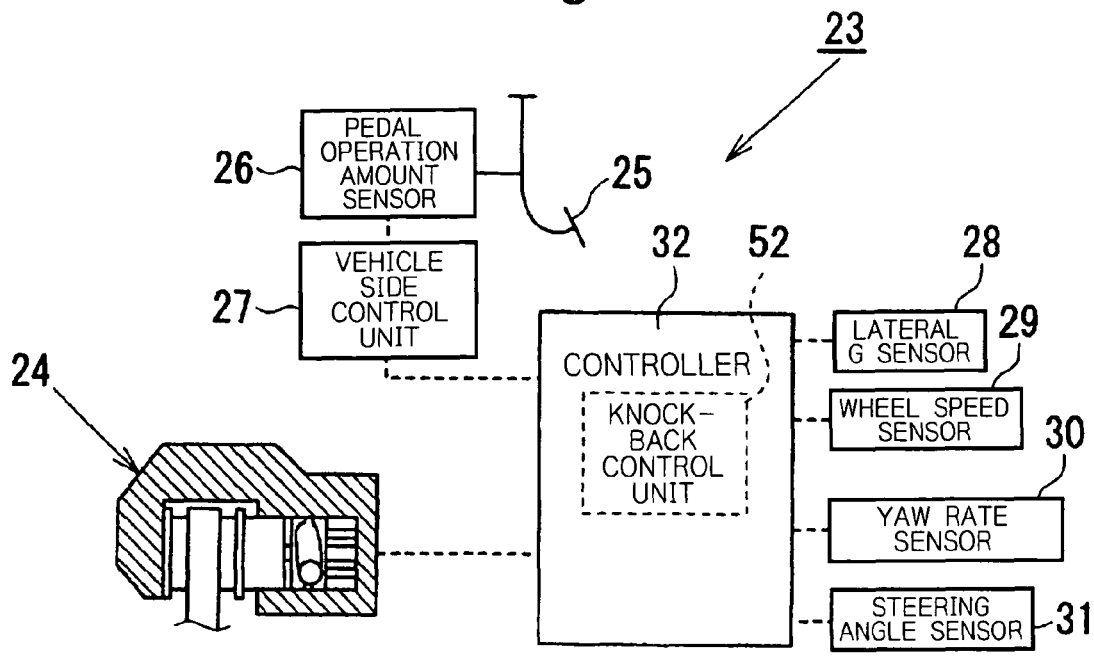
FIG. 11 is a block diagram schematically illustrating a structure of a brake apparatus according to a fourth embodiment of the present invention.

Next, a fourth embodiment of the present invention will be described with reference to FIGS. 11 to 14. FIG. 11 schematically illustrates the structure of a brake apparatus according to the present embodiment. As shown in FIG. 11, a brake apparatus 23 comprises an electric disk brake 24 mounted on each of wheels (only one wheel shown), a pedal operation amount sensor 26 coupled to a brake pedal 25, a vehicle side control unit 27 connected to the pedal operation amount sensor 26, and various sensors for detecting a vehicle condition such as a lateral acceleration sensor 28, a wheel speed sensor 29, a yaw rate sensor 30, and a steering angle sensor 31. The brake apparatus 23 further comprises a controller 32 (controlling device) for controlling the electric disk brake 24 for each wheel based on detection signals from the various sensors and an instruction signal from the vehicle side control unit 27. The components generally constituting the brake apparatus 23 are interconnected via a network installed in the vehicle, and necessary control signals are exchanged therebetween.

Figure 12:
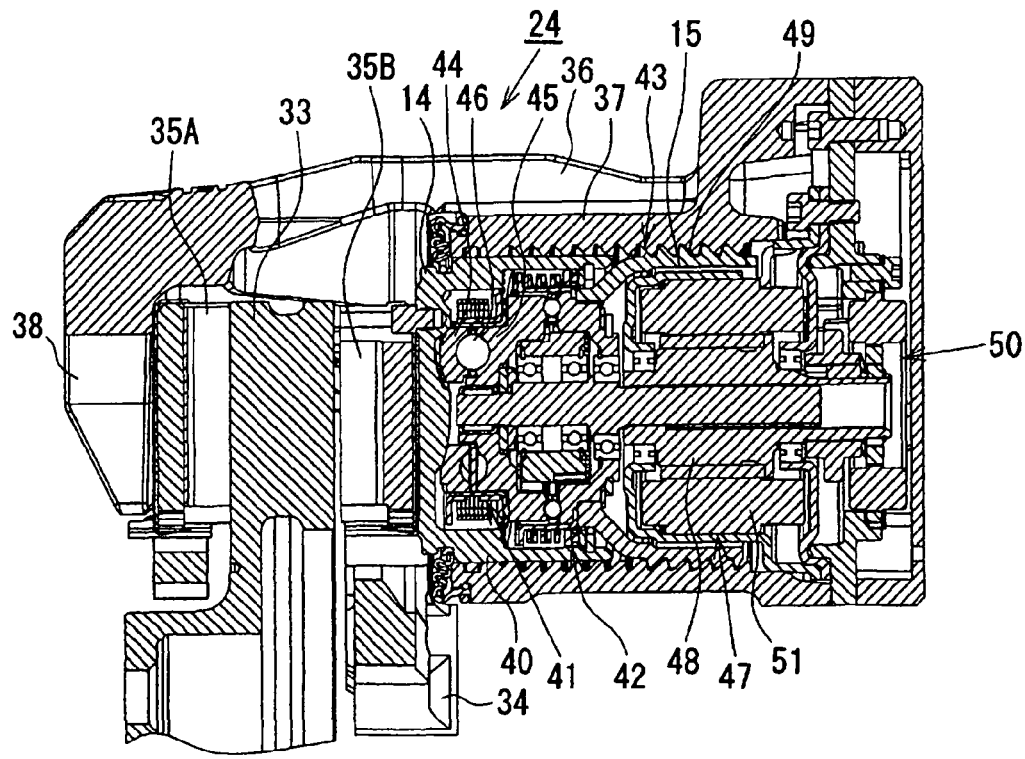
FIG. 12 is an enlarged vertical sectional view illustrating a disk brake of the brake apparatus shown in FIG. 11.
Figure 13:
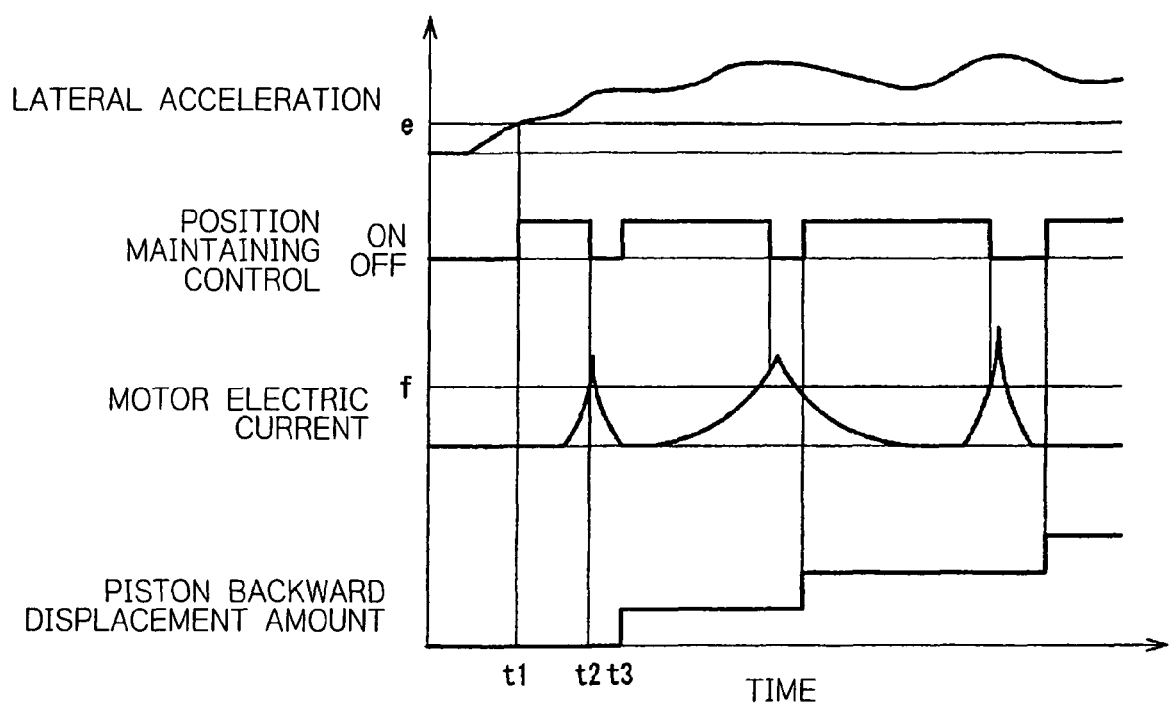
FIG. 13 shows a time chart illustrating a control performed by a knock-back control unit of a controller, with regard to the brake apparatus shown in FIG. 11.

As shown in FIG. 12, the electronic disk brake 24 is a caliper-floating type disk brake. The electronic disk brake 24 comprises a disk rotor 33 rotatable together with the wheel, a carrier 34 fixed to a non-rotational portion (not shown) on the vehicle side such as a suspension member, a pair of brake pads 35A and 35B disposed on the respective sides of the disk rotor 33 and supported by the carrier 34, and a caliper body 36 disposed so as to extend over or straddle the disk rotor 33 and supported so as to be movable along the axial direction of the disk rotor 33 relative to the carrier 34.

The caliper body 36 comprises a cylindrical cylinder portion 37 having a through-hole open to one side of the disk rotor 33, a claw portion 38 extending from the cylinder portion 37 to the opposite side of the rotor 33 over the disk rotor 33. The cylinder portion 37 and the claw portion 38 are integrally formed. The cylinder portion 37 of the caliper body 36 contains a piston unit and a motor unit.

The piston unit 53 is formed by integrally assembling a bottomed cylindrical piston 40 (pusher) slidably fitted in the cylinder portion 37, a ball ramp mechanism 41 (rotation-linear motion converting mechanism) and a differential speed reducing mechanism 42 contained in the piston 40, and a pad wear compensating mechanism 43. The ball ramp mechanism 41 comprises a rotation disk 44, a linear motion disk 45, and balls 46 (steel balls) disposed in an inclined groove between the rotation disk 44 and the linear motion disk 45. A relative rotation between the rotation disk 44 and the linear motion disk 45 causes a rolling motion of each of the balls 46 in the inclined groove, which in turn causes an axial relative displacement between the rotation disk 44 and the linear motion disk 45 according to a rotation angle. In this way, a rotational movement is converted to a linear movement. In the present embodiment, a rotation-linear motion converting mechanism is embodied by the ball ramp mechanism 41, although it may be embodied by, for example, a ball screw mechanism, a roller ramp mechanism, or a precision roller screw mechanism.

The differential speed reducing mechanism 42 is interposed between the ball ramp mechanism 41 and an electric motor 47 (electric actuator) of the motor unit 39 (electric mechanism). The mechanism 42 is adapted to reduce a rotation speed of a rotor 48 of the electric motor 47 at a predetermined speed reducing ratio, and then transmit the sloweddown rotation to the rotation disk 44 of the ball ramp mechanism 41. The pad wear compensating mechanism 43 is adapted to advance an adjusting screw 49 to cause an advance of the ball ramp mechanism 41 accordingly, when the brake pads 35A and 35B are abraded (or the contact positions of the pads with the disk rotor 33 are changed).

The motor unit 39 comprises the electric motor 47 and a resolver 50 incorporated therein. Application of an electric current to a coil of a stator 51 of the electric motor 47 causes a rotation of the rotor 48, whereby the ball ramp mechanism 41 is driven through the differential speed reducing mechanism 42. At this time, a rotational position of the rotor 48 is detected by the resolver 50.

The electric disk brake 2 is operated by the controller 32 in the following manner.

(Normal Brake Operation Actuated by a Driver)

The vehicle side control unit 27 determines an instruction value of a thrust force (braking force) of the piston 40 based on an operation of the brake pedal 25 by a driver detected by the pedal operation amount sensor 26. The controller 32 supplies a control electric current to the electric motor 47 based on the thrust force instruction value of the piston 40 determined by the vehicle side control unit 27, and causes a rotation of the rotor 48. The rotation of the rotor 48 is slowed down by the differential speed reducing mechanism 42 at a predetermined reducing ratio, and is converted into a linear motion by the ball ramp mechanism 41 to cause a forward movement of the piston 40. Due to the forward movement of the piston 40, the brake pad 35B or one of the brake pads is pressed against the disk rotor 33. A reactive force generated by this pressing displaces the caliper body 36, causing the claw portion 38 to press the brake pad 10A or the other of the brake pads against the disk rotor 8, whereby a braking force is generated. The thrust force (braking force) of the piston 40 is controlled to the instruction value by adjusting the rotation of the electric motor 47 based on the rotational position of the rotor 48 detected by the resolver 50. Wear of the brake pads 10A and 10B is compensated by the pad wear compensating mechanism 43, in which the adjusting screw 49 of the mechanism 43 advances to push forward the ball ramp mechanism 41 by a distance corresponding to a wear amount.

(Braking Operation by the Controller)

The controller 32 detects vehicle conditions including a rotational speed of each wheel, a vehicle speed, a vehicle acceleration, a steering angle, a vehicle lateral acceleration and the like, with use of various sensors such as the lateral acceleration sensor 28, the wheel speed sensor 29, the yaw rate sensor 30, and the steering angle sensor 31. Then, the controller 32 can perform the boosting control, the anti-lock control, the traction control, the vehicle stability control and the like by controlling a rotation of the electric motor 47 according to these detection results.

In addition, the controller 32 includes a knock-back control unit 52, which performs a knock-back control as will be described below. The knock-back control performed by the knock-back control unit 52 will now be described with reference to the time chart shown in FIG. 13.

(Knock-Back Detection)

When a large lateral acceleration (for example, a lateral acceleration more than 3 m/s$^2$) occurs in the vehicle during a turning movement of the vehicle, the disk rotor 33 is tilted under the influence of a lateral force acting on the wheel, and the brake pads 35A and 35B are pushed back. The brake pad 35B pushes the piston 40, and therefore a retraction which is a movement of the piston 40 away from the disk rotor 33, i.e., a knock-back may occur. At this time, as will be described later, the position of the piston 40 is maintained for a predetermined time. The knock-back control unit 52 determines that there is possibility of occurrence of the above-mentioned retraction, i.e., the knock-back based on the detection value of the lateral acceleration sensor 28 when the lateral acceleration exceeds a predetermined threshold value "e". Then, the knock-back control unit 52 starts (ON) a position maintaining control for maintaining the position of the piston 40 based on the rotational position signal of the rotor 48 detected by the resolver 50, and starts to monitor an electric current of the electric motor 47 by an electric current sensor in the controller 32 (time t1). When the electric current of the electric motor 47 exceeds a predetermined threshold value "f", the unit 52 detects that a force for displacing the piston 40 away from the rotor 33 by a knock-back is applied to the piston 40, and then determines that a retraction which is a movement of the piston 40 away from the disk rotor 33, i.e., a knock-back actually occurs (time t2). Then, the unit 52 stops (OFF) the position maintaining control of the piston 40, and displaces backward the piston 40 by a predetermined distance, and then restarts the position maintaining control (time t3). After that, if it is continuously determined that there is possibility of a knock-back (the electric current of the electric motor 47>the threshold value f), these processes are sequentially repeated to displace backward the piston 40 against the knock-back. In the present embodiment, knock-back occurrence is determined by comparison between the electric current of the electric motor 47 and the threshold value "f", although it may be determined instead by comparison between the time integral of the electric current of the electric motor 47 and a predetermined threshold value.

(Pad Clearance Adjustment)

After that, when the lateral acceleration becomes equal to or lower than the threshold value "e", it is determined that a cause for the retraction which is a movement of the piston 40 away from the disk rotor 33, i.e., the knock-back is eliminated. After it is determined that the cause for the knock-back is eliminated, the vehicle running condition is analyzed based on the detection results of the wheel speed sensor 29, the yaw rate sensor 30, the steering angle sensor 31 and the like. If it is determined that the vehicle is running in the normal condition which does not cause a knock-back (for example, the vehicle is running straight), the electric motor 47 is actuated to cause the piston 40 to move forward, and the clearance between the brake pads 35A, 35B and the disk rotor 33 is adjusted. At this time, the pad clearance can be appropriately adjusted by causing the piston 40 to move forward to be closer to the disk rotor 33 to a position where the piston 40 was located before the knock-back occurrence, based on the rotational position signal of the rotor 48 detected by the resolver 50.

Figure 14:
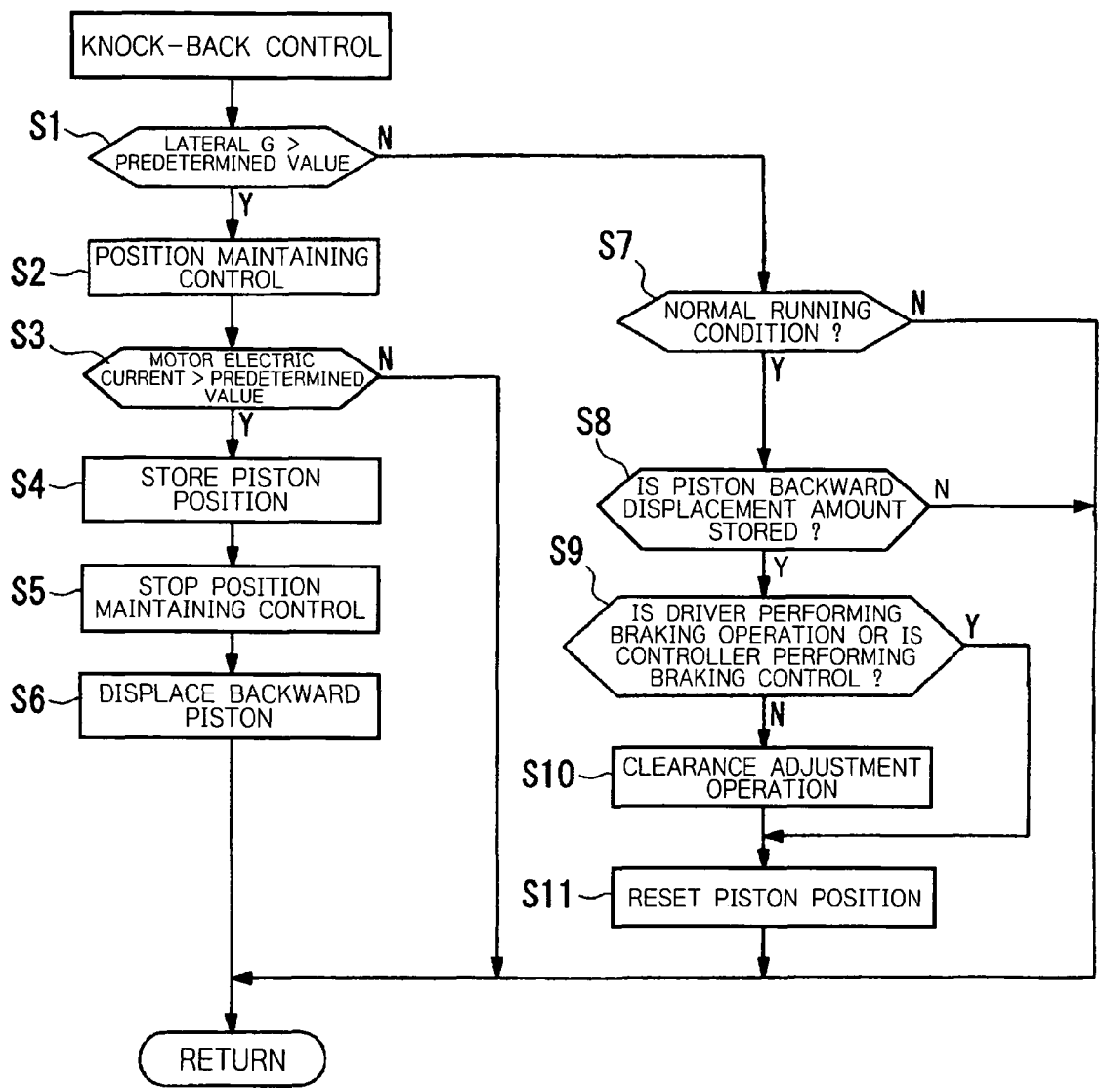
FIG. 14 shows a flow chart of the control performed by the knock-back control unit of the controller of the brake apparatus shown in FIG. 11.

More specifically, the knock-back control performed by the knock-back control unit 52 will be described with reference to the flow chart shown in FIG. 14. Referring to FIG. 14, at step S1, it is determined whether the vehicle is running in the turning condition that may cause a retraction which is a movement of the piston 40 away from the disk rotor 33, i.e. a knock-back, by determining whether the lateral acceleration detected by the lateral acceleration sensor 28 exceeds the predetermined threshold value "e". If the detected lateral acceleration exceeds the threshold value, then the flow proceeds to step S2. At step S2, the unit 52 starts the position maintaining control for maintaining the position of the piston 40, and starts to monitor the electric current of the electric motor 47 with use of the electric sensor in the controller 32, and the flow proceeds to step S3. At step S3, the electric current of the electric motor 47 is compared to the threshold value "f". If the electric current of the electric motor 47 exceeds the threshold value "f", then it is determined that a retraction which is a movement of the piston 40 away from the disk rotor 33, i.e., a knock-back actually occurs, and the flow proceeds to step S4. At step S4, the position of the piston 40 is stored based on the rotational position signal of the rotor 48 detected by the resolver 50. Then, the position maintaining control is stopped at step S5, and at step 6, the piston 40 is displaced backward by a certain distance by actuating the electric motor 47, and the current routine is ended. If it is determined at step S3 that the electric current of the electric motor 47 does not exceed the threshold value "f", it is determined that a knock back does not occur, and the current routine is ended.

On the other hand, at step S1, if the lateral acceleration does not exceed the threshold value "e", then the flow proceeds to step S7. At step S7, the vehicle running condition is analyzed based on the detection results of the vehicle speed sensor 29, the yaw rate sensor 30, the steering angle sensor 31 and the like, and it is determined whether the vehicle is running in the normal running condition that does not cause a knock-back (for example, the vehicle is running straight). If it is determined at step S7 that the vehicle is not running in the normal running condition, then the current routine is ended. If it is determined at step S7 that the vehicle is running in the normal condition, then the flow proceeds to step S8. At step S8, it is determined whether the position of the piston 40 is stored. If it is determined at step S8 that the position of the piston 40 is not stored, then the current routine is ended. If it is determined at step 8 that the position of the piston 40 is stored, then it is determined that the vehicle has returned from the turning condition causing a knock-back to the normal running condition, i.e., a cause for the retraction which is a movement of the piston 40 away from the disk rotor 33 is eliminated, and then the flow proceeds to step S9. At step S9, it is determined whether the driver is performing a braking operation or the controller 32 is performing any braking-related control such as the anti-lock control, the traction control, or vehicle stability control.

If it is determined at step S9 that the driver is not performing a braking operation or that the controller 32 is not performing a braking-related control, then the flow proceeds to step S10. At step S10, the pad clearance adjustment is performed by actuating the electric motor 47 to cause the piston 40 to move forward to be closer to the disk rotor 33 by the displacement amount of the piston 40 corresponding to the distance from the current position of the piston 40 to the stored position where the piston was located before the knock-back occurrence. At step 11, the memory of the position of the piston 40 is reset, and then the current routine is ended. If it is determined at step S9 that the driver is performing a braking operation or that the controller 14 is performing a braking-related control, then the flow proceeds to step S11. The memory of the position of the piston 40 is reset at step S11, and the current routine is ended. At this time, since the controller 32 performs a braking-related control for each wheel, the pad clearance adjustment at step 10 is not performed on a wheel receiving a braking-related control, if any.

In this way, when a retraction which is a movement of the piston 40 away from the disk rotor 33, i.e., a knock-back occurs during the non-braking condition, especially during the turning condition, the piston 40 is allowed to be displaced backward so that uneven wear of the brake pads 35A, 35B and the disk rotor 33 can be prevented. Then, when a cause for the above-mentioned retraction, i.e., the knock-back is eliminated and the vehicle running condition returns to normal, the piston 40 is caused to move forward to be closer to the disk rotor 18, and the pad clearance is appropriately adjusted so that deterioration of the responsiveness of the brake apparatus 23 can be prevented.

In the present embodiment, the electric sensor in the controller 32 serves as a detector by detecting a retraction which is a movement of the piston 40 away from the disk rotor 33 based on the turning condition of the vehicle. In addition, in the present embodiment, the resolver 50 serves as a displacement amount calculator by calculating how far the piston 40 moves away from the disk rotor 33 at a retraction.

Figure 15:
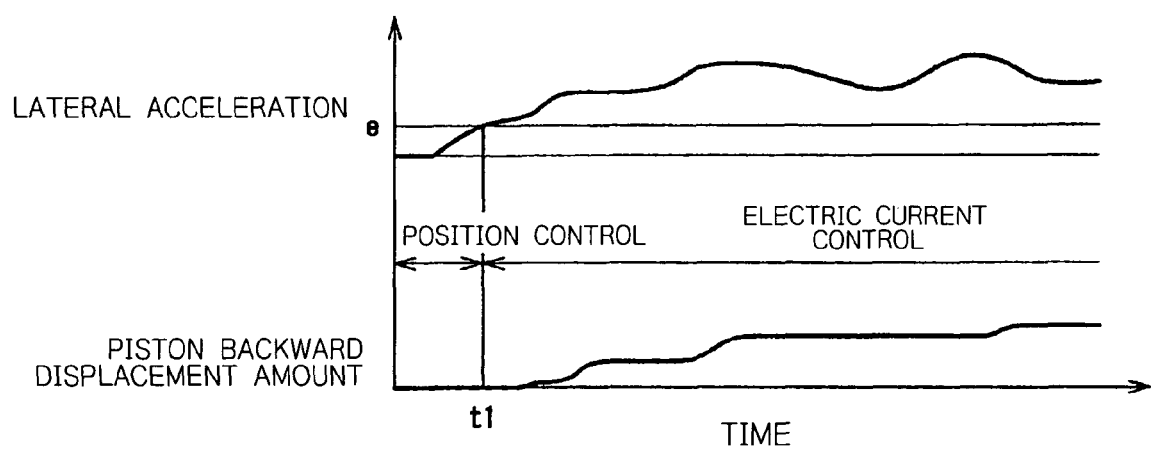
FIG. 15 shows a time chart illustrating a control performed by a knock-back control unit of a controller, with regard to a brake apparatus according to a fifth embodiment of the present invention.
Figure 16:
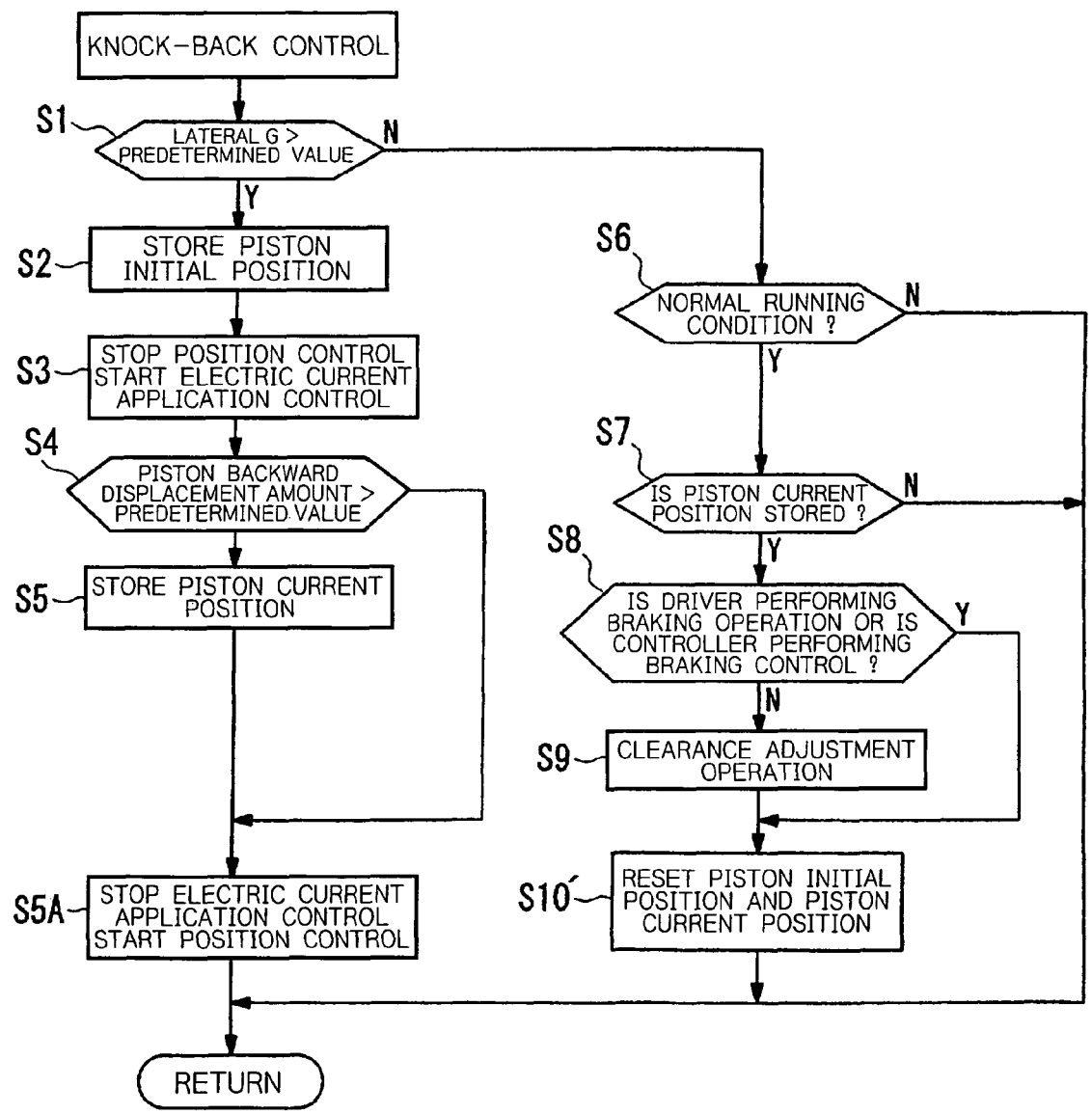
FIG. 16 shows a flow chart of the control performed by the knock-back control unit of the controller of the brake apparatus according to the fifth embodiment of the present invention.

Next, a fifth embodiment of the present invention will be described with reference to FIGS. 15 and 16. The fifth embodiment has a substantially similar structure to that of the fourth embodiment, except that the knock-back control performed by the knock-back control unit of the controller 32 in the fifth embodiment is partially different from that in the fourth embodiment. Therefore, like components are denoted by like reference numerals as of the fourth embodiment, and only components and features different from or absent in the fourth embodiment will be described in detail.

(Knock-Back Detection)

The knock-back control performed in the present embodiment will be described with reference to the time chart shown in FIG. 15. In the brake apparatus according to the present embodiment, the knock-back control unit of the controller 32 determines that there is possibility of occurrence of a retraction which is a movement of the piston 40 away from the disk rotor 33, i.e., a knock-back when the lateral acceleration exceeds the predetermined threshold "e" (time t1) based on the detection result of the lateral acceleration sensor 28. At this time, the knock-back control unit applies to the electric motor 47 an electric current required for maintaining the position of the piston 40, confirms that the position of the piston 40 is maintained, and stores the electric current value at that time with use of the electric current sensor in the controller 32. The initial position of the piston 40 (the rotational position of the rotor 48) at that time is stored based on the detection value of the revolver 50. Then, the unit starts an electric current application control for applying an electric current of the stored electric current value to the electric motor 47. In addition, the unit starts to monitor the rotational position signal of the rotor 48 detected by the resolver 50. The disk rotor 33 is tilted under the influence of a lateral force acting on the wheel, and the piston 40 is pushed back through the brake pad 35B, so that a retraction which is a movement of the piston 40 away from the disk rotor 33, i.e., a knock-back occurs. When a force for displacing the piston 40 away from the disk rotor 33 is acted on the piston 40 by the knock-back in this way, a force stronger than the force for maintaining the position of the piston 40 based on the electric current of the stored electric current value is applied to the piston 40, and therefore the piston 40 starts to move backward, i.e., move away from the disk rotor 33. The displacement amount at this time is detected by the resolver 50 as a rotational position signal of the rotor 48.

(Pad Clearance Adjustment)

After that, when the lateral acceleration becomes equal to or less than the predetermined threshold value "e", it is determined that a cause for the retraction which is a movement of the piston 40 away from the disk rotor 33, i.e., the knock-back is eliminated. After the elimination of the cause for the knock-back is determined, the vehicle running condition is analyzed based on the detection results of the wheel speed sensor 29, the yaw rate sensor 30, the steering angle sensor 31 and the like. If it is determined that the vehicle is running in the normal condition which does not cause a knock-back (for example, the vehicle is running straight), the clearance between the brake pads 35A, 35B and the disk rotor 33 is adjusted by actuating the electric motor 47 and causing the piston 40 to move forward. At this time, the pad clearance can be appropriately adjusted by causing the piston 40 to move forward to be closer to the disk rotor 33 to the position where the piston 40 was located before the knock-back occurrence, based on the rotational position signal of the rotor 48 detected by the resolver 50.

More specifically, the knock-back control performed by the knock-back control unit 52 will be described with reference to the flow chart shown in FIG. 16. Referring to FIG. 16, at step S1, it is determined whether the lateral acceleration detected by the lateral acceleration sensor 28 exceeds the predetermined threshold value "e". If it is determined the detected lateral acceleration exceeds the threshold value, then the flow proceeds to step S2. At step S2, the initial position of the piston 40 (the rotational position of the rotor 48) is stored based on the rotational position signal of the rotor 48 detected by the resolver 50. At step S3, the position control of the electric motor 47 is stopped, and the electric current application control as mentioned above is started, and then flow proceeds to step S4. At step S4, if it is determined the displacement amount of the piston 40 exceeds the predetermined value, it is determined that a retraction which is a movement of the piston 40 away from the disk rotor 33, i.e., a knock-back actually occurs. At step S5, the current position of the piston 40 is stored, and then, at step S5A, the electric current application control is stopped and the position control is started. Then, the current routine is ended.

On the other hand, if it is determined at step S1 that the lateral acceleration does not exceed the threshold value "e", then the flow proceeds to step S6. At step S6, the vehicle running condition is analyzed based on the detection results of the wheel speed sensor 29, the yaw rate sensor 30, the steering angle sensor 31 and the like, and it is determined whether the vehicle is running in the normal condition that does not cause a knock-back (for example, the vehicle is running straight). If it is determined at step S6 that the vehicle is not in the normal condition, then the current routine is ended. If it is determined at step S6 that the vehicle is running in the normal condition, then the flow proceeds to step S7. At step 7, it is determined whether the current position of the position 40 is stored. If it is determined at step S7 that the current position of the piston 40 is not stored, then the current routine is ended. If it is determined at step S7 that the current position of the piston 40 is stored, then it is determined that the vehicle has returned from the turning condition causing a knock-back to the normal running condition, i.e., a cause for the retraction which is a movement of the piston 40 away from the disk rotor 33 is eliminated, and the flow proceeds to step S8. At step S8, it is determined whether the driver is performing a braking operation or whether the controller 32 is performing any braking-related control such as the anti-lock control, the traction control, or the vehicle stability control.

If it is determined at step S8 that the driver is not performing a braking operation or the controller 32 is not performing a braking-related control, then the flow proceeds to step S9. At step S9, the pad clearance is adjusted by actuating the electric motor 47 and causing the piston 40 to move forward to be closer to the disk rotor 33 by the displacement amount of the piston 40 corresponding to the distance from the stored current position of the piston 40 to the stored initial position of the piston 40 before the knock-back occurrence. Then, the flow proceeds to step S10', and the memories of the initial position and the current position of the piston 40 are reset, ant the current routine is ended. If it is determined at step S8 that the driver is performing a braking operation or that the controller 32 is performing a braking-related control, then the flow proceeds to step S10'. At step S10', the memories of the stored positions of the piston 40 are reset and the current routine is ended. At this time, since the controller 32 performs a braking-related control for each wheel, the pad clearance adjustment at step S9 is not performed on a wheel receiving a braking-related control, if any.

In this way, when a retraction which is a movement of the piston 40 away from the disk rotor 33, i.e., a knock-back occurs during the non-braking condition, especially during the turning condition, the piston 40 is allowed to be displaced backward so that uneven wear of the brake pads 35A, 35B and the disk rotor 33 can be prevented. Then, when a cause for the above-mentioned retraction, i.e., the knock-back is eliminated and the vehicle running condition returns to normal, the piston 40 is caused to move forward to be closer to the disk rotor 18, and the pad clearance is appropriately adjusted so that deterioration of the responsiveness of the brake apparatus 23 can be prevented.

In the present embodiment, the resolver 50 serves as a detector for detecting a retraction which is a movement of the piston 40 away from the disk rotor 33 based on the vehicle turning condition, and a displacement amount calculator for calculating an amount of the movement of the piston 40 away from the disk rotor 33 at a retraction.

In the first to third embodiments, in a normal braking operation performed by a driver, a braking force is generated by directly supplying a fluid pressure generated by the master cylinder to the cylinder 15 of the disk brake 2. However, these embodiments may employ a so-called "Brake-by-wire" system in which an operation of the brake pedal 19 is converted to an electrical signal, and the pressure increasing valve 5, the pump motor 7 and the supply valve 9 are controlled by a control signal from the controller so that a braking force is generated, as the fourth and fifth embodiments employ it.

As mentioned above, according to the brake apparatuses of the herein discussed embodiments, when a knock-back, in which the pusher of the disk brake moves away from the disk rotor, occurs, the brake pad is allowed to be displaced backward so that uneven wear of the disk rotor and the brake pad can be prevented. Then, when a cause for the knock-back is eliminated, the pusher of the brake pad is moved forward so that deterioration of the responsiveness of the brake apparatus can be prevent.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2008-011708, filed on Jan. 22, 2008.

The entire disclosure of Japanese Patent Application No. 2008-011708 filed on Jan. 22, 2008 including specification, claims, drawings and summary is incorporated herein by reference in its entirety.

What is claimed is:

1. A brake apparatus comprising:
a braking mechanism including an electric motor which is operable to actuate a pusher adapted to push a brake pad against a disk rotor of a vehicle;
a controller operable to control the braking mechanism in response to an operation of a brake pedal, and also operable to control the braking mechanism independently from an operation of the brake pedal; and
a first detector operable to detect a condition causing a retraction, which is a movement of the pusher away from the disk rotor, when braking is not in operation,
a second detector operable to detect a retraction of the pusher; and
wherein the controller controls the electric motor to displace the pusher backward when the second detector detects the retraction of the pusher;
wherein, after the pusher is displaced backward, when it is determined that a cause for the retraction is eliminated, the controller causes the pusher to move close to the disk rotor by the electric motor.

2. The brake apparatus according to claim 1,
wherein the controller stores the position of the pusher before the retraction of the pusher occurs, and the controller returns the pusher to the stored position by the electric motor when it is determined that the cause of the refraction is eliminated.

3. The brake apparatus according to claim 2, wherein the first detector includes a lateral acceleration sensor, and determines that the cause of the retraction of the pusher is eliminated when a detection value of the lateral acceleration sensor is equal to or smaller than a threshold value.

4. The brake apparatus according to claim 1, wherein the controller controls the electric motor to displace the pusher backward by a predetermined distance, when the first detector detects the condition causing the retraction of the pusher.

5. The brake apparatus according to claim 4, wherein the controller performs position maintaining control to maintain the position of the pusher after displacing backward the pusher by the predetermined distance by the electric motor.

6. The brake apparatus according to claim 4, wherein the second detector detects that the disk rotor pushes the brake pad, and the controller repeats the backward displacement of the pusher by the predetermined distance while the first detector detects a condition causing a retraction of the brake pad.

7. The brake apparatus according to claim 6, wherein the second detector detects that the disk rotor pushes the brake pad based on a change in an electric current supplied to the electric motor.

8. The brake apparatus according to claim 1, wherein the first detector includes a lateral acceleration sensor, and determines that the cause of the retraction of the pusher is eliminated when a detection value of the lateral acceleration sensor is equal to or smaller than a threshold value.

9. The brake apparatus according to claim 1, wherein the controller stores the position of the pusher before the retraction of the pusher occurs, and the controller returns the pusher to the stored position by the braking mechanism when it is determined that the cause of the retraction of the pusher is eliminated and no braking operation or braking control intervenes.

10. A brake apparatus comprising:
a braking mechanism operable to actuate a piston adapted to push a brake pad against a disk rotor of a vehicle;
a controller operable to control the braking mechanism in response to an operation of a brake pedal, and also operable to control the braking mechanism independently from an operation of the brake pedal; and
a knock-back detector operable to detect a knock-back in which the piston moves away from the disk rotor, when braking is not in operation,
wherein, after the knock-back detector detects the knock-back, when it is determined that a cause for the knock-back is eliminated, the controller can cause the piston to move close to the disk rotor by the braking mechanism,
wherein the braking mechanism includes an electric motor,
wherein the knock-back detector includes a sensor adapted to detect whether there is a possibility of occurrence of the knock-back, and
wherein the controller includes a knock-back control unit adapted to compare at least one of an electric current supplied to the electric motor and a time integral of the electric current with a threshold value when the sensor detects that there is the possibility of occurrence of the knock-back, and determine that the knock-back occurs if at least one of the electric current supplied to the electric motor and the time integral of the electric current exceeds the threshold value;
wherein the controller controls the electric motor to displace the piston backward when it is determined that knock-back occurs.

11. The brake apparatus according to claim 10, wherein the knock-back detector detects whether there is a possibility of occurrence of the knock-back based on a turning condition of the vehicle.

12. The brake apparatus according to claim 11, wherein, when it is determined that the cause for the refraction is eliminated, the controller determines an amount by which the piston is caused to move close to the disk rotor by the braking mechanism, based on the turning condition of the vehicle detected by the knock-back detector.

13. The brake apparatus according to claim 10, wherein the controller starts position maintaining control to maintain a position of the piston when the sensor detects that there is a possibility of occurrence of the knock-back, and stops the position maintaining control when determining that the knock-back occurs.

14. The brake apparatus according to claim 13, wherein the controller displaces the piston backward after stopping the position maintaining control.

15. The brake apparatus according to claim 13, wherein the controller restarts the position maintaining control after stopping the position maintaining control and displacing the piston backward by the electric motor by a predetermined distance.

16. The brake apparatus according to claim 15, wherein the controller repeats the stop of the position maintaining control at the time of the occurrence of the knock-back, the backward displacement of the piston by the predetermined distance, and the restart of the position maintaining control while the sensor detects that there is the possibility of occurrence of the knock-back.

17. The brake apparatus according to claim 10, wherein the sensor includes a lateral acceleration sensor adapted to detect a lateral acceleration of the vehicle, and wherein the knock-back controller determines that there is the possibility of occurrence of the knock-back if a detection value of the lateral acceleration sensor exceeds a first threshold value, and determines that the cause of the knock-back is eliminated if the detection value of the lateral acceleration sensor is equal to or smaller than a second threshold value.

18. The brake apparatus according to claim 10, wherein the controller stores the position of the piston before the knock-back occurs, and the controller returns the piston to the stored position by the electric motor when it is determined that the cause of the knock-back is eliminated.

19. The brake apparatus according to claim 18, wherein the controller stores the position of the piston when determining that the knock-back occurs, and does not store the position of the piston when determining that the knock-back does not occur.

20. The brake apparatus according to claim 10, wherein the controller stores the position of the piston before the knock-back occurs, and the controller returns the piston to the stored position by the braking mechanism when it is determined that the cause of the knock-back is eliminated and no braking operation or braking control intervenes.

* * * * *